United States Patent
Bonnet

(10) Patent No.: US 6,182,813 B1
(45) Date of Patent: Feb. 6, 2001

(54) SIDE CONVEYOR DISC INCLUDING QUICK-CHANGE FEATURES

(75) Inventor: Henri Bonnet, Atlanta, GA (US)

(73) Assignee: United Parcel Service of America, Atlanta, GA (US)

( * ) Notice: Under 35 U.S.C. 154(b), the term of this patent shall be extended for 0 days.

(21) Appl. No.: 09/069,424

(22) Filed: Apr. 29, 1998

(51) Int. Cl.[7] .................................................. B65G 47/46
(52) U.S. Cl. ........................................................ 198/370.09
(58) Field of Search ............................ 198/370.09, 371.3

(56) References Cited

U.S. PATENT DOCUMENTS

| | | |
|---|---|---|
| 1,462,511 | 7/1923 | Lister . |
| 1,549,499 | 8/1925 | Parker . |
| 2,062,604 | 12/1936 | Paxton . |
| 3,138,238 | 6/1964 | De Good et al. . |
| 3,291,279 | 12/1966 | De Good et al. . |
| 3,303,923 | 2/1967 | Davis . |
| 3,642,113 | 2/1972 | Burgis . |
| 3,782,527 | 1/1974 | Petershack . |
| 4,019,627 | 4/1977 | Eggert et al. . |
| 4,143,755 | 3/1979 | Keller . |
| 4,509,636 | 4/1985 | Godbois . |
| 4,598,815 | 7/1986 | Adama . |
| 4,696,386 | 9/1987 | Lem . |
| 4,730,718 | 3/1988 | Fazio et al. . |
| 4,880,099 | 11/1989 | Leemkull et al. . |
| 4,962,841 | 10/1990 | Kloosterhouse . |
| 4,979,606 | 12/1990 | Usui . |
| 5,165,516 | 11/1992 | Reed et al. . |

FOREIGN PATENT DOCUMENTS

| | | |
|---|---|---|
| 25 47 899 | 4/1977 | (DE) . |
| 28 18 425 | 11/1979 | (DE) . |
| 0 287 171 A1 | 10/1988 | (EP) . |
| 0 569 073 A1 | 11/1993 | (EP) . |
| 2 164 831 | 8/1973 | (FR) . |
| 2 255 235 | 7/1975 | (FR) . |
| 2 407 149 | 5/1979 | (FR) . |
| 2 464 899 | 3/1981 | (FR) . |
| 5-254641 * | 10/1993 | (JP) ................................ 198/370.09 |

* cited by examiner

Primary Examiner—James R. Bidwell
(74) Attorney, Agent, or Firm—Alston & Bird LLP

(57) ABSTRACT

An automated conveyor sortation and item discharge system for sorting items of various sizes and weights to designated output destinations along a conveyor is provided. The system utilizes a discharge drum ejection mechanism mounted medially between a pair of parallel cog belt conveyors for ejecting an item such as a parcel laterally from the surface of the cog belt conveyors to an adjacent chute or slide. The discharge drum of the ejection mechanism is generally rectangular and defines convex opposing sides separated by the longer diameter of the drum. The convex sides of the discharge drum define flexible ridges for contacting an overlying parcel to be discharged from the surfaces of the cog belt conveyors. The flexible ridges enhance translation of the item or parcel by the discharge drum and serve to reduce noise caused by the impact of the discharge drum with the overlying parcel. A tapered discharge drum may be used to counteract rotation of the parcel during discharge. A programmable controller may be provided to control the conveyor system and the discharge of items from the conveyor by the ejection mechanisms. The system is easy to repair and operates at high speeds at reduced noise levels. Also provided is a relatively flat disc intermediate a conveyor gap, which may be disassembled without disturbing the shaft to which the disc is mounted.

21 Claims, 19 Drawing Sheets

SIDE CONVEYOR DISC INCLUDING QUICK-CHANGE FEATURES

CROSS-REFERENCE TO EARLIER-FILED APPLICATION

This application is a continuation-in-part of a previously-filed application Ser. No. 08/841,201, filed Apr. 29, 1997, entitled "High Speed Drum Sorting Conveyor Systems".

TECHNICAL FIELD

This invention relates to automated sorting of items such as parcels to a variety of output destinations, and more particularly relates to conveyor systems which have the capability to rapidly and reliably discharge parcels (which can also be referenced as packages) or other items thereon to either side of a conveying path, such that the packages or other items may be transported elsewhere.

BACKGROUND OF THE INVENTION

In modern high volume package delivery systems, package delivery services utilize a variety of material handling systems. Such material handling systems often include package conveying systems that divert packages to a variety of output destinations such as chutes, bins, and conveyor systems.

One of the most conventional types of conveyors is a belt conveyor, which includes the use of an endless flexible belt which passes over at least two cylindrical rollers, one of which is a drive roller. Packages are placed atop the upwardly-directed "working" surface of the belt conveyor, and are transported in a generally straight direction from end of the conveyor to the other. Another type of conveyor is a "roller" conveyor which con include powered or idling rollers which contact, support, and in certain instances propel the bottom of the package along its path.

Systems for diverting objects from a moving conveyor have been available for many years. Such systems are useful in discharging objects from a conveying surface at selected stations located along the path of the conveying surface.

Some package diverting systems utilize a pusher element or member mounted on or beneath a conveying surface which when actuated ejects a package laterally across the conveying surface to a desired discharge station. Many such systems guide a pusher element laterally across the conveying surface using a complex series of guide tracks, or elements mounted beneath the conveying surface. Other systems utilize a means for elevating and tilting a package above and away from the upper surface of a conveying surface so that the package may be withdrawn to an awaiting chute or discharge station. Still other systems have been known to collapse the conveying surface such that the package falls to a subjacent conveying surface on which the package is translated to a desired discharge location.

U.S. Pat. No. 1,462,511 discloses another conveyor diverter. A side conveyor extends perpendicular from a main conveyor. A set of diverting rollers are configured perpendicular to the main conveyor and are raised above the upper surface of the main conveyor to cause an object to be diverted from the surface of the main conveyor under force of gravity across the set of diverting rollers.

U.S. Pat. No. 1,549,499 discloses an elevating means for use in connection with roller bed sorting tables for raising a box or parcel a slight distance above the plane of the roller bed to allow the box or parcel to be withdrawn to an awaiting chute or discharge station. A box or parcel to be discharged is brought to a state of rest at a sorting station immediately above an elevating roller. The elevating roller is raised by depressing a foot lever. The box or parcel positioned over the elevating roller is raised off the roller bed which allows an operator to pull the box or parcel off the roller bed on to an adjacent chute or discharge station.

A box or parcel switching unit for discharging a box sideways on to an adjacent storage conveyor or chute is disclosed in U.S. Pat. No. 2,062,604. A box or parcel is brought to a stopped position on a receiving conveyor and overlying a discharge conveyor. The receiving conveyor is dropped from beneath the box or parcel allowing it to come to rest on the discharge conveyor. The box or parcel is then translated off the surface of the discharge conveyor to an awaiting adjacent conveyor or chute.

U.S. Pat. No. 3,138,238 discloses a conveyor system with a powered diverter for diverting an object from the surface of a main conveyor to an awaiting side conveyor. The powered diverter includes an assembly of diverting wheels that are oriented toward the side conveyor. The group of diverting wheels are normally positioned below the upper surface of the main conveyor so that objects traveling on the main conveyor do not contact the diverting wheels. In order to divert an object from the main conveyor to the side conveyor, the diverting wheels are elevated so that they are slightly above the upper surface of the main conveyor. Accordingly, an object traveling down the main conveyor is diverted by contact with the elevated diverting rollers.

U.S. Pat. No. 3,291,279 to DeGood likewise discloses a conveyor system with a powered diverter, which as shown in FIG. 8 works in conjunction with a shifting linkage 200. Chains of powered roller elements are used, which are indexed upwardly to engage packages to eject them at an angle from the original conveying path.

U.S. Pat. No. 3,303,923 to Davis discloses a conveyor diverter mechanism which includes a number of relatively thin conveying belts 25, 26, and 27 which are indexed upwardly as shown in FIG. 2 to engage and withdraw a selected package.

U.S. Pat. No. 4,598,815 to Adama discloses a powered roller diverter which includes a single row of powered diverter rollers which can be selectively indexed upwardly to engage and eject a package on a belt conveyor path. The single row of diverter rollers is selectively indexed upwardly from within a transverse gap between the downstream roller of an upstream conveyor to the upstream roller of a downstream conveyor, such that the rollers engage and discharge a package sidewardly.

U.S. Pat. No. 4,730,718 to Fazio discloses a 'bi-directional mechanism" which, as shown well in FIG. 1, shows a plurality of elastomeric belts 76 mounted upon an indexable table assembly associated with a conveyor assembly. The belts are supported by indexable rollers such that portions of the belts can be indexed upwardly within elongate slots defined between elongate conveyor rollers being part of the conveyor assembly, to cause the belt portions to engage packages otherwise atop the conveyor rollers, and to eject them to either side of the conveyor path. The Kloosterhouse patent (U.S. Pat. No. 4,962,841), owned by the same assignee, likewise discloses such a configuration.

U.S. Pat. No. 4,979,606 to Usui discloses a transporting direction controlling device applicable to conveyor systems. As shown in FIGS. 1–5 of the Usui patent, the device utilizes a rotor member comprised substantially of a cylindrical or disk-shaped roller which is tiltable in variable directions for tilting the plane of the upper surface of the rotor member. By tilting the direction of the plane and the rotating direction of the rotor member, the transporting direction of a box or package may be changed. As shown in FIGS. 3(A)–3(D) of Usui, force is exerted on an object by tilting the plane of the rotating device so that the object will be moved in the direction tangent to the direction of travel of the upper most portion of the tilted rotating device. In practice, Usui describes using the rotating device in concert with a plurality of similar rotating devices to form a direction changing station, as shown in FIGS. 5 and 12. As shown in FIGS. 6 and 21, guide plates 116, 118, and 312 are used to define a direction change path for the object.

U.S. Pat. No. 5,165,516 to Reed discloses a three-way transfer conveyor which includes transfer belts which are selectively driven to the left and to the right at right angles to the conveyor rollers. As in the Fazio and Kloosterhouse references, the rubber belts fit into elongate transverse "gaps" between the conveyor rollers.

In some of those systems, diverter mechanisms are utilized to divert an object from the upper surface of a conveying surface by bringing the object to a complete stop overlying the diverter mechanism and then either raising the diverter mechanism or lowering the object so that the diverter mechanism comes into contact with the object. Bringing the object to a complete stop prior to being diverted causes a significant reduction in the efficiency and speed of operation of the conveyor system. Some of those systems move a diverter into the path of a moving object. Problems associated with those systems include the inability to eject objects laterally from the surface of a moving conveying system at ejection speeds which are independent of the speed of the moving conveyor system.

Other limitations in the prior art include an inability to eject objects laterally at a high speed without encountering rotation of the package or object as it is discharged from the surface of the moving conveyor. Furthermore, such systems may be noisy and relatively difficult to repair when diverter systems components fail.

Finally, some prior art systems are complex in construction and require substantial disassembly in order to replace the discharge elements should they wear out.

Thus, there is a need in the art for a sorting conveyor system that can discharge or eject an object from a conveying surface without bringing the object to a stop and without changing the position or speed of the conveying surface. There is also a need in the art for a sorting conveyor system that can discharge or eject an object from a conveying surface at high speeds and without undesired rotation of the object during discharge. There is further a need in the art for a sorting conveyor system that is quiet during operation and which is easily repaired. Finally, there is a need in the art for a conveying device which allow for quick changes of replacement parts in order to reduce downtime.

SUMMARY OF THE INVENTION

The present invention seeks to provide an improved system for efficiently discharging items of various sizes and weights from a moving conveying surface. The present invention allows an object to be discharged laterally from the surface of a moving conveyor independent of the speed of the moving conveyor. An object may be discharged without raising an object diverter or ejection mechanism into the path of the moving object and without lowering the conveying surface to allow a moving object to contact a subjacent object diverter or ejection mechanism. The present invention is simple in construction and may be easily maintained by the quick removal and substitution of failed components.

Generally described, the present invention comprises a conveying and diverting apparatus for selectively discharging conveying parcels having a lower surface from a conveying path, the conveying and diverting apparatus comprising a conveyor defining an elongate gap transverse to the path, and a substantially planar disc configured for extending upwardly through the gap to contact the lower surface of the parcels, the disc being powered to eject a parcel with a force lying substantially parallel to said gap.

More particularly described, the present invention comprises a conveying and diverting apparatus for selectively discharging conveying parcels having a lower surface from a conveying path, the conveying and diverting apparatus comprising a conveyor defining an elongate gap transverse to the path, the conveyor including at least one conveyor belt assembly defining one edge of the gap, and a substantially planar disc configured for extending upwardly through the gap to contact the lower surface of the panels, the disc being powered to eject a parcel with a force lying substantially parallel to said gap.

The present invention also provides a conveying and diverting apparatus for selectively discharging conveying parcels having a lower surface from a conveying path, the conveying and diverting apparatus comprising a conveyor configured for conveying parcels along the conveying path by supporting the lower surfaces of the parcels, the conveyor defining an elongate gap transverse to the path, a substantially planar disc rotatably mounted about an axis substantially parallel to the conveying axis, the disc having a substantially round periphery except for a peripherally reduced portion, means for rotatably mounting the disc relative to the conveyor gap such that when the disc is at a first rotational position, the disc interferes with the parcels in the conveyor path, but when the disc is at a second rotational position, the disc does not interfere with the parcels in the conveyor path, and means for selectively rotating the disc from the first to the second rotational position, such that parcels on the conveyor may be correspondingly selectively discharged from the conveying path upon rotation of the disc timed to contact of the round periphery portion with the lower surfaces of the parcels and to discharge the parcels.

The present invention also provides a conveying and diverting apparatus for selectively discharging conveying parcels having a lower surface from a conveying path, conveying and diverting apparatus comprising a conveyor configured for conveying parcels along the conveying path by supporting the lower surfaces of the parcels, the conveyor defining an elongate gap transverse to the path, a substantially planar disc rotatably mounted about an axis substantially parallel to the conveying axis, the disc having a substantially circular periphery, a disc supporting shaft substantially rigidly attached to and supporting the disc, means for rotatably mounting the disc supporting shaft relative to the conveyor gap along an indexing rotational axis such that the when the disc is at a first indexed position, the disc interferes with the parcels in the conveyor path, but when the disc is at a second indexed position, the disc does not interfere with the parcels in the conveyor path, and means for selectively indexing the disc supporting shaft about is longitudinal axis while the disc supporting shaft is rotating, such that parcels on the conveyor may be correspondingly selectively discharged from the conveying path upon the indexing of the disc supporting shaft which causes the disc to contact the lower surfaces of the parcels and to discharge the parcels.

Finally, the present invention, an apparatus for conveying articles, the apparatus comprising a first conveyor portion, second conveyor portion spaced from the first conveyor portion so as to define an elongate gap therebetween, an ejection disc configured for extending through the gap and the conveyor, a disc supporting shaft for supporting the disc, and shaft rotating means for rotatably driving the supporting shaft, the ejection disc being configured to be removed from the disc supporting shaft without disengaging the shaft rotating means from the shaft.

Therefore, it is an aspect of the present invention to provide an improved automated conveyor sorting system.

It is a further aspect of the present invention to provide an improved ejection mechanism for ejecting items from a conveying surface.

It is a further aspect of the present invention to provide a conveyor which is simple in construction.

It is a further aspect of the present invention to provide a conveyor which is reliable in construction.

It is a further aspect of the present invention to provide a conveyor which is simple in operation.

It is a further aspect of the present invention to provide a conveyor which is cost-effective to manufacture, operate, and maintain.

It is a further aspect of the present invention to provide an improved conveyor which may be easily dismantled for repair and maintenance.

It is a further aspect of the present invention to provide an improved apparatus for conveying and sorting items that can be repaired by quickly removing failed sub-assemblies.

It is a further aspect of the present invention to provide a conveyor which operates at reduced noise levels.

Other aspects, features, and advantages of the present invention will become apparent upon reading the following detailed description of the preferred embodiment of the invention when taken in conjunction with the drawing and the appended claims.

DETAILED DESCRIPTION OF THE PREFERRED EMBODIMENT

Figure 1:
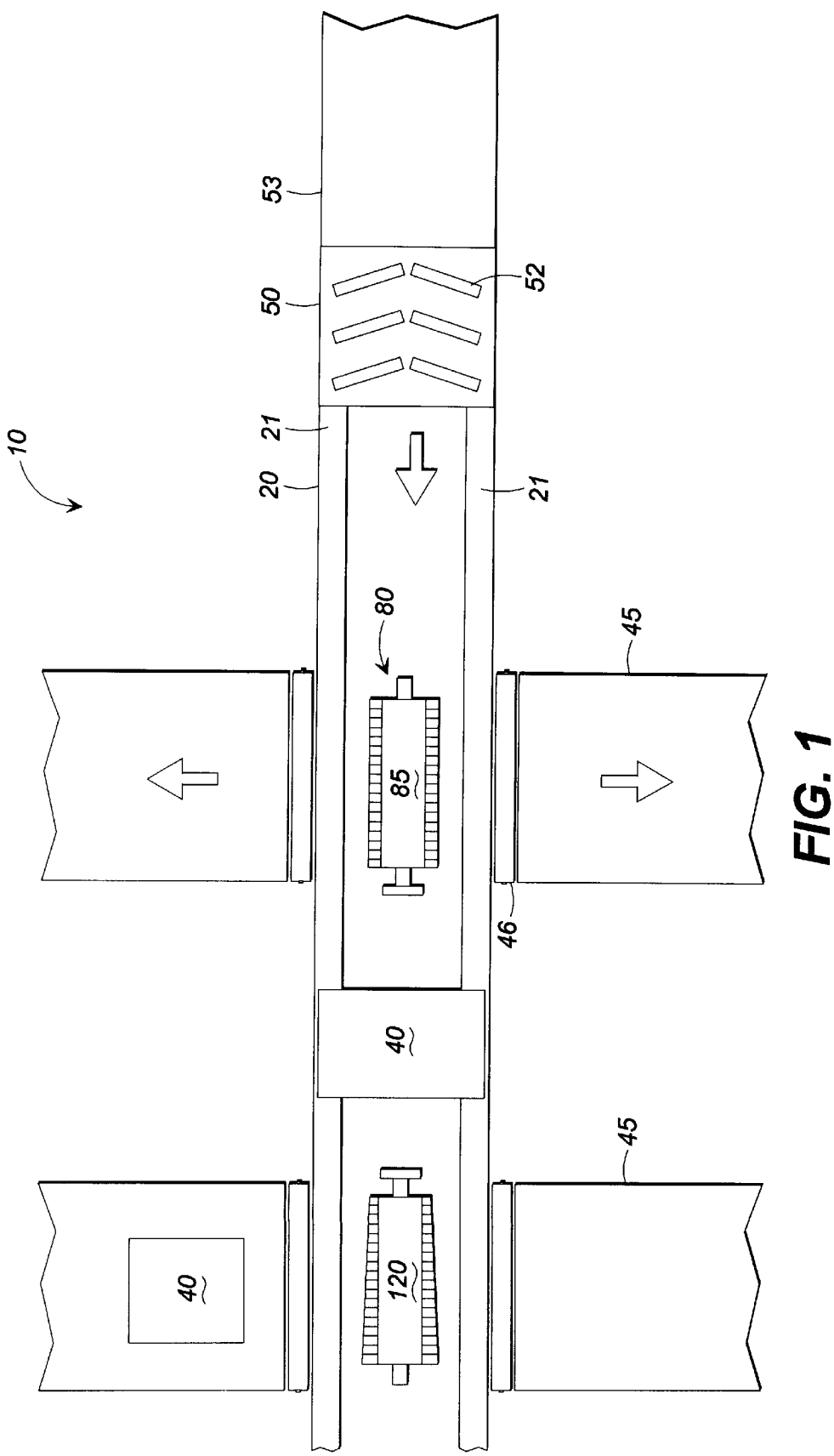
FIG. 1 is a top plan view of an automated sorting system embodying the present invention.
Figure 2:
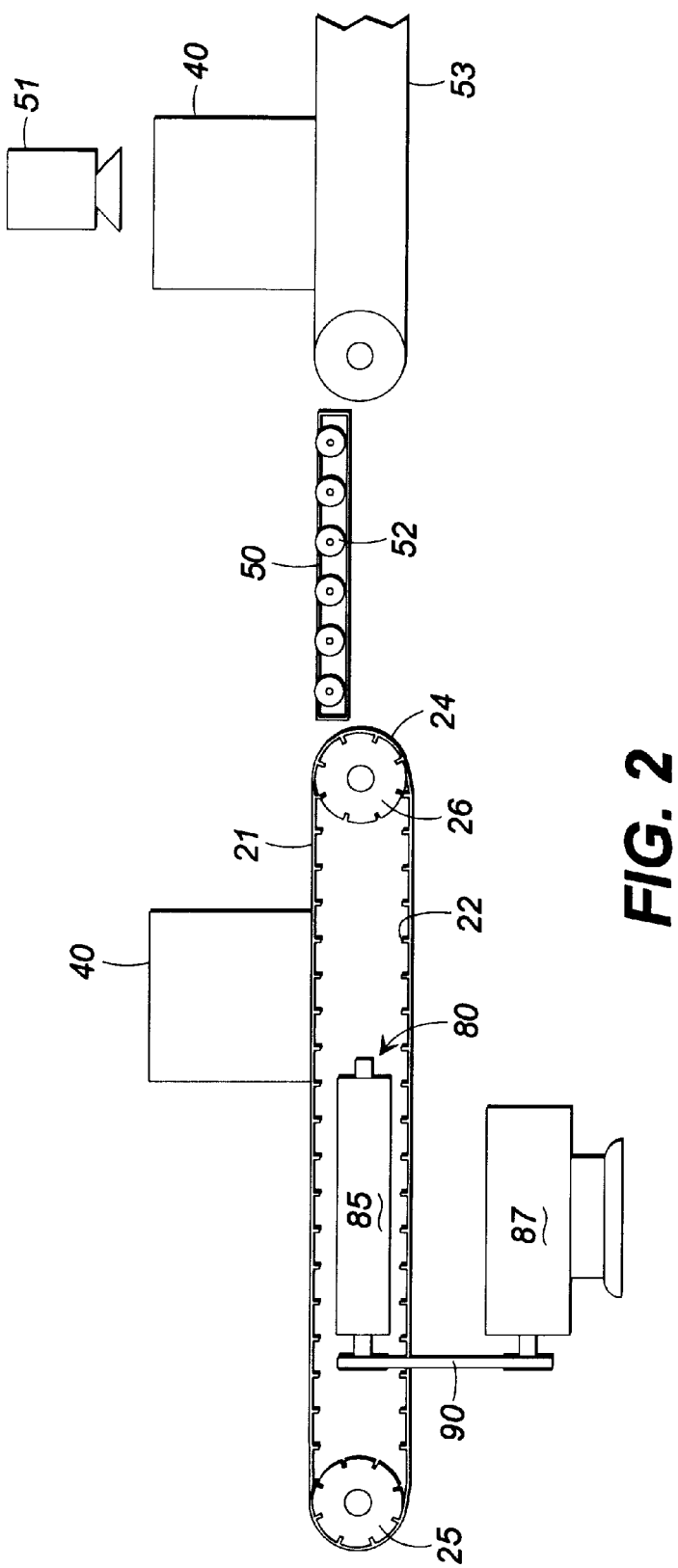
FIG. 2 is a side diagrammatic view of the automated sorting system of FIG. 1.
Figure 3:
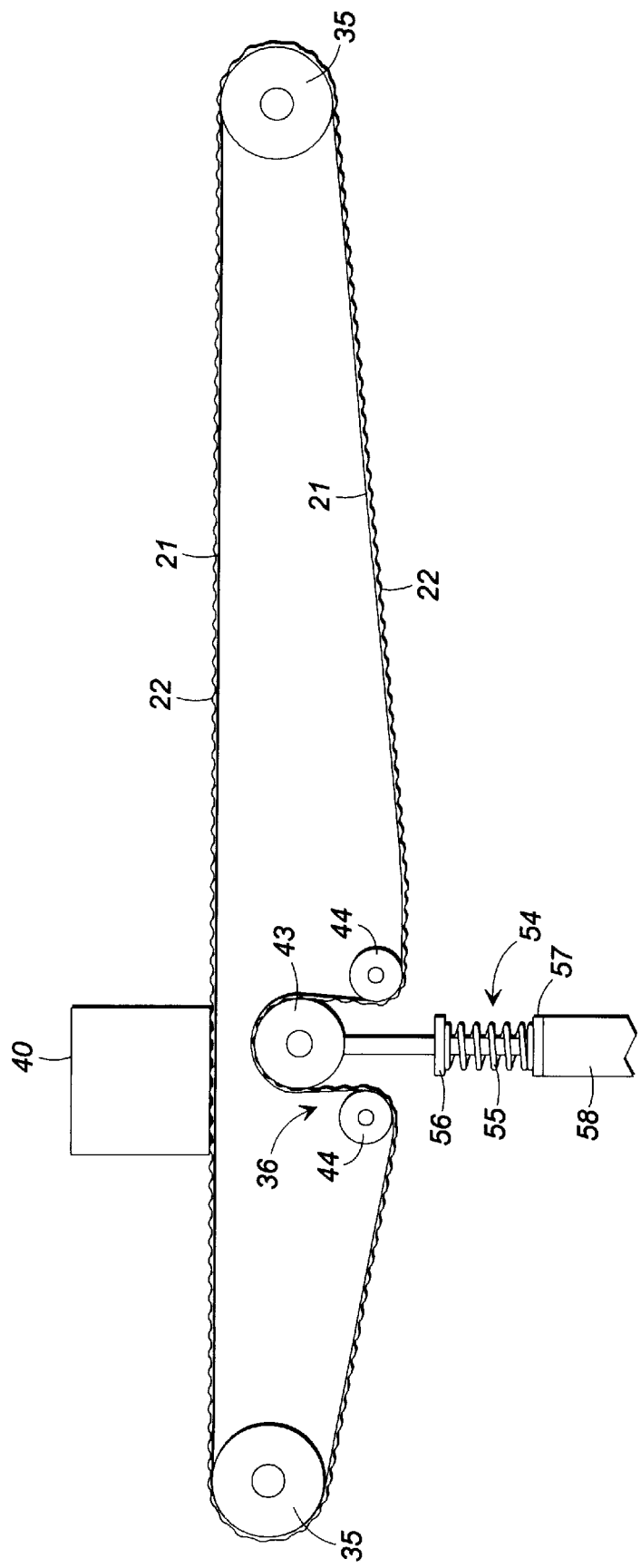
FIG. 3 is a side diagrammatic view of a cog belt conveyor system showing a self-tensioning gear motor drive system.

Referring now in more detail to the drawings, in which like numerals refer to like parts throughout the several drawings, FIG. 1 shows a top plan view of an automated sorting system embodying the present invention. With reference to FIGS. 1, 2 and 3, the sorting system 10 preferably includes a cog belt conveyor system 20 comprised of a pair of continuous cog belt conveyors 21 positioned in parallel spaced-apart relation. In a preferred form shown, the cog belt conveyor system 20 forms a closed loop. As shown in FIGS. 1 and 2, the cog belt conveyor system 20 may include a plurality of ejection mechanisms 80 for discharging items, such as parcels 40, from the surface of the parallel cog belt conveyors 21 onto a variety of output destinations such as receiving chutes 45, a parallel conveyor (not shown), or a non-parallel conveyor (not shown).

Figure 6:
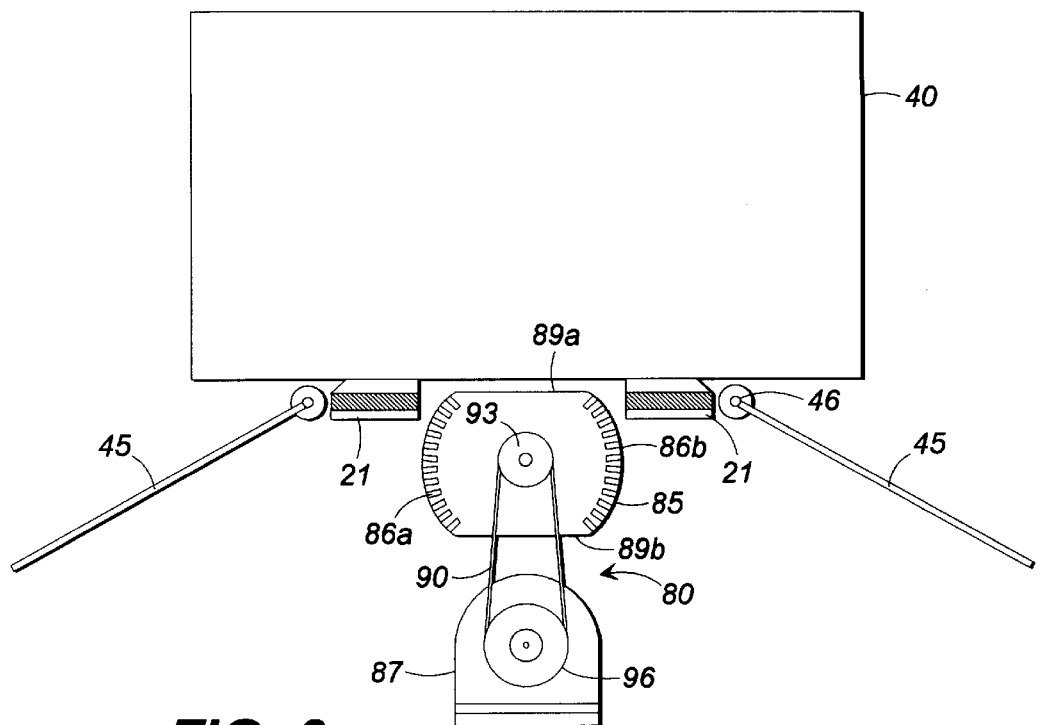
FIG. 6 is an end view of a discharge drum ejection mechanism of the present invention.

The parcels 40 may be loaded onto the cog belt conveyor system 20 manually or by a feed conveyor 53. A conventional centering roller bed 50 may be used to properly orient the parcels 40 onto the conveying surfaces of the cog belt conveyors 21, as shown in FIG. 1. Other sub-assemblies of the sorting system 10 include a self-tensioning gear motor drive system 36 for providing proper tension in the cog belt conveyors 21 of the cog belt conveyor system 20, as shown in FIG. 6. The assemblies and sub-assemblies thus far noted and shown will now be described in detail.

Referring still to FIGS. 1 and 2, the cog belt conveyor system 20 is comprised of a pair of cog belt conveyors 21 configured in spaced-apart relation for transporting an object such as parcel 40 on the upper surface of the cog belt conveyors 21. In the preferred form shown, the cog belt conveyors 21 include a smooth outer conveying surface. Cog teeth 22 are disposed along the inner surface of the cog belt conveyors 21 for engaging a cog belt drive mechanism 24. The drive mechanism 24 preferably includes a drive sprocket 26 configured for engagement with the cog teeth 22 disposed along the inner surface of the cog belt conveyors 21, as shown in FIG. 2. An electric motor (not shown) is preferably functionally attached to the drive sprocket 26. As shown in FIG. 2, the cog belt conveyors 21 are supported at the end opposite the cog belt drive means 24 by an idle sprocket 25.

A feed conveyor 53 is provided for automatically loading objects, such as parcel 40, onto the cog belt conveyor system 20. A centering roller bed 50 is interposed between the feed conveyor 53 and the cog belt conveyor system 20. The centering roller bed 50 is comprised of a plurality of rollers 52 configured in a herringbone configuration. Preferably, the roller bed 50 serves to center and properly orient an object such as a parcel 40 onto the parallel cog belt conveyors 21, as shown in FIG. 1. As shown in FIG. 1, a plurality of discharge chutes 45 are provided adjacent to the cog belt conveyors 21 for receiving parcels 40 discharged from the surface of the cog belt conveyors 21, as will be discussed and detailed below. It should be understood, that a variety of discharge destinations may be utilized, such as bins and separate conveyors (not shown).

An alternate configuration for the cog belt conveyor system 20 is shown in FIG. 3. In the alternate configuration for the cog belt conveyor system 20, the cog belt conveyors 21 are supported by a pair of idler rollers 35. As shown in FIG. 3, the cog belt conveyors 21 of this embodiment are disposed about the idler rollers 35 such that the outer conveying surface of the cog belt conveyors 21 include cog teeth for engagement with a self-tensioning gear motor drive system 36. The inner surface of the cog belt conveyors 21 are smooth for engagement with the idler rollers 35.

Figure 4:
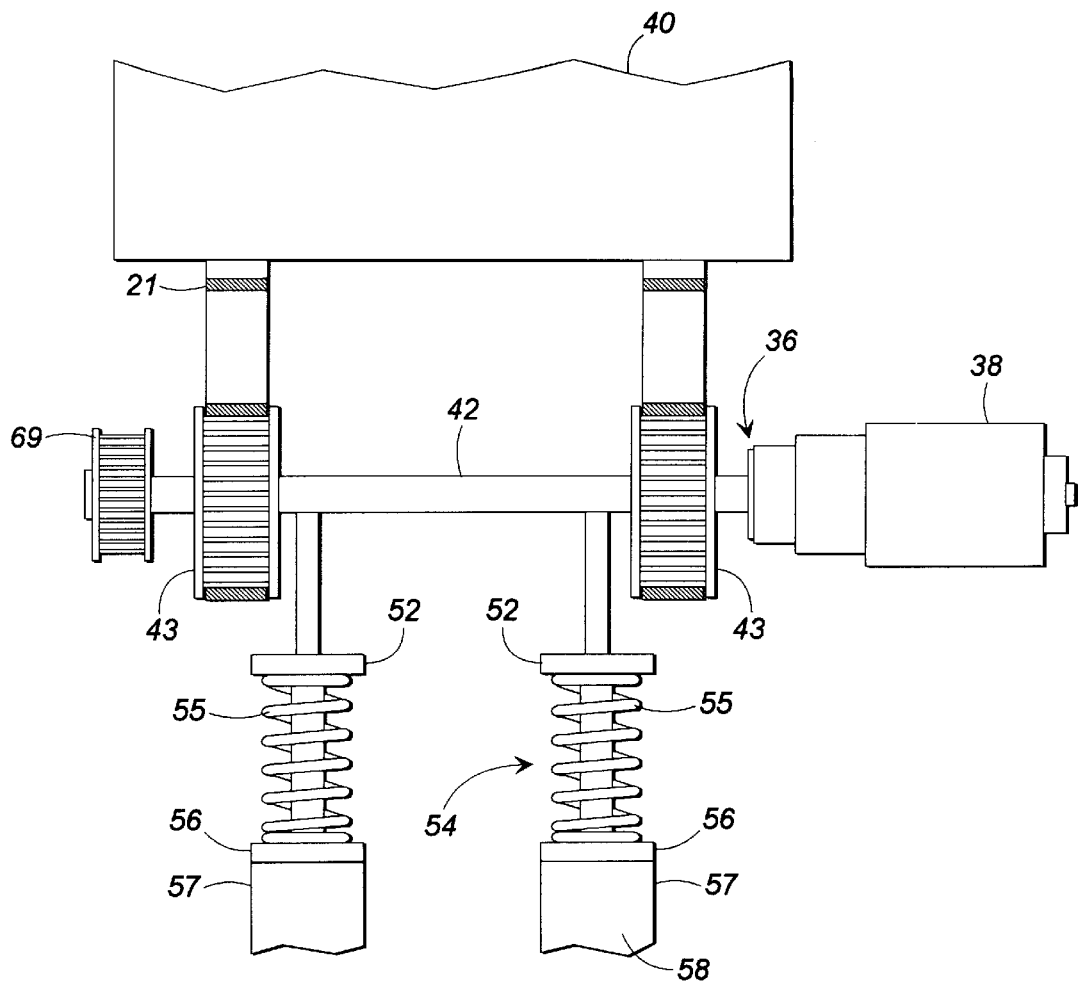
FIG. 4 is an end view of part of the gear motor drive system of FIG. 3.

The self-tensioning gear motor drive system 36 includes a reversible gear motor 38. As shown in FIG. 4, the reversible gear motor 38 is attached to a drive shaft 42 on which is disposed a pair of drive sprockets 43 for engaging and driving the pair of parallel cog belt conveyors 21. As shown in FIG. 3, a pair of snub rollers 44 are utilized to keep the cog belt conveyors 21 in continuous engagement with the drive sprockets 43.

A tensioning mechanism 54 is provided for maintaining proper tension in the cog belt conveyors 21 of this embodiment of the present invention. As shown in FIG. 4, the tensioning mechanism 54 is comprised of a tension spring 55 which is retained by a spring retaining member 52. At the lower end of the tension spring 55 is a spring compression and release member 56. The spring compression and release member 56 is actuated by hydraulic cylinder 57 which contains hydraulic fluid 58. As is well known to those skilled in the art, a suitable pneumatic cylinder may be used in place of the hydraulic cylinder 57. Tension in the cog belt conveyors 21 may be increased by manually actuating the hydraulic cylinder 57, or operation of the tensioning mechanism 54 may be directed by a programmable logic controller (not shown). It should be understood, that a variety of tension spring mechanisms may be used in place of the tensioning mechanism 54 for manually or automatically maintaining constant tension in the cog belt conveyors 21.

Figure 5:
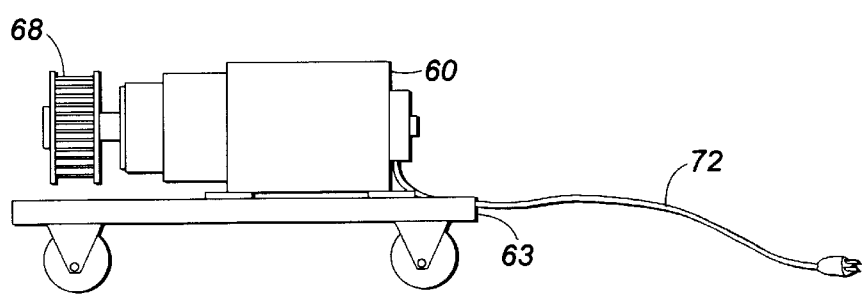
FIG. 5 is a side elevation view of a portable gear motor mounted on a wheeled table.

Referring now to FIGS. 4 and 5, a portable gear motor 60 is provided for powering the sprockets 40 and cog belt conveyors 21 in the event of a failure of the reversible gear motor 38. As show in FIG. 4, the portable gear motor 60 is mounted on a wheeled table 63 to allow the portable gear motor 60 to be moved into any desired position. As shown in FIG. 4, an emergency drive sprocket 68 is disposed on the end of the drive shaft 42 opposite the reversible gear motor 38. As shown in FIGS. 4 and 5, the portable gear motor 60 includes a drive sprocket 69 for engagement with the emergency drive sprocket 68. A power cord 72 is included for providing power to the portable gear motor 60.

Referring now to FIGS. 1, 2, 6 and 7, the sorting system 10 includes a plurality of ejection mechanisms 80 for ejecting an object, such as a parcel 40, laterally from the upper surface of the cog belt conveyors 21 to an adjacently disposed discharge destination, such as a chute 45, or other desired discharge destination, such as a bin, or alternate conveyor. The ejection mechanism 80, shown in FIGS. 1 and 6, is disposed medially of the parallel cog belt conveyors 21. The ejection mechanism 80 is mounted subjacent to the upper surface of the cog belt conveyors 21.

Figure 7:
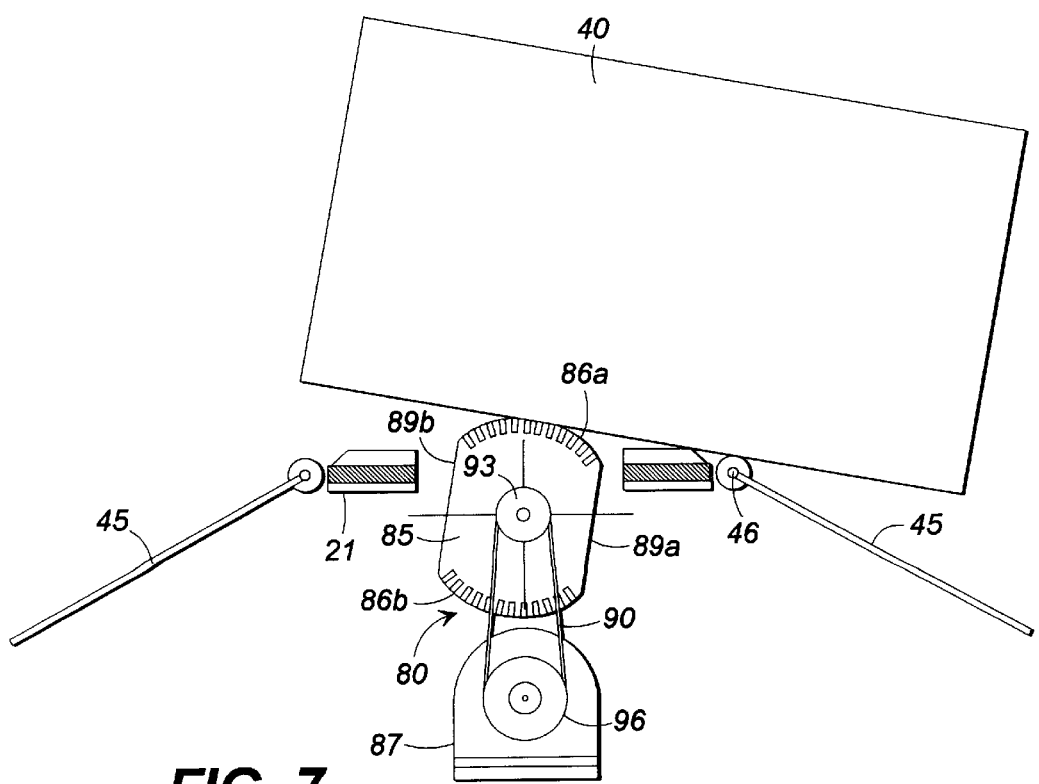
FIG. 7 is an end view of the discharge drum ejection mechanism of FIG. 6, showing a parcel being discharged to a discharge chute.
Figures 8, 10:
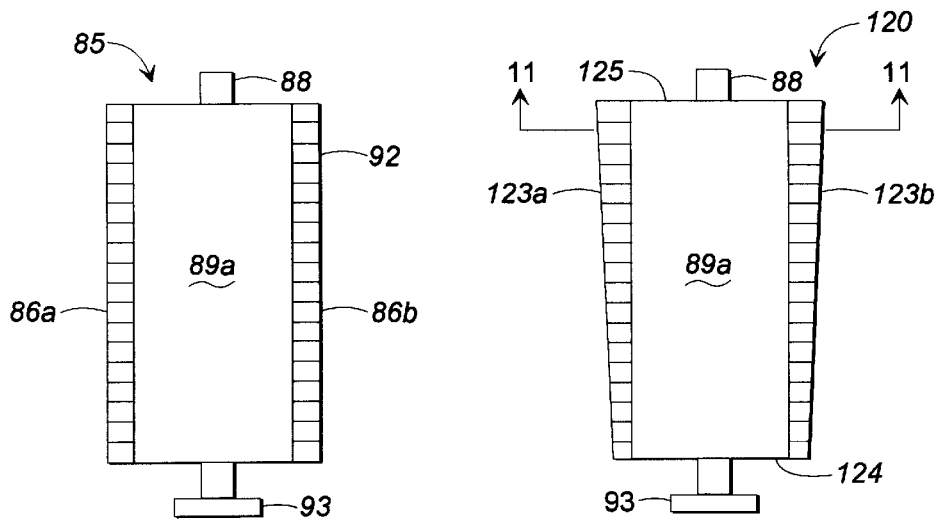
FIG. 8 is a top plan view of a discharge drum of the present invention.
FIG. 10 is a top plan view of a tapered discharge drum of the present invention.

The ejection mechanism 80 includes a discharge drum 85 and a discharge drum drive motor 87, as shown in FIGS. 6, 7 and 8. As shown in FIGS. 6 and 8, the discharge drum 85 is an elongate member defining a generally rectangular transaxial cross-section and having upper and lower surfaces 89a and 89b. The discharge drum 85 has first and second opposing sides 86a and 86b. which are disposed adjacent to the upper and lower surfaces 89a and 89b. The first and second opposing sides 86a and 86b are generally convex shaped and are separated by the longer cross-sectional diameter of the discharge drum 85.

As shown in FIGS. 6, 7 and 8, a plurality of flexible ridges 92 are disposed along the surfaces of the convex opposing sides 86a and 86b of the discharge drum 85. The flexible ridges 92 may be made from any suitable polymer material such as polyurethane. As will be discussed below, the flexible ridges 92 assist in ejecting an overlying object, such as the parcel 40 from the conveying surface of the cog belt conveyors 21.

A discharge drum drive shaft 88 is configured through the central longitudinal axis of the discharge drum 85. A discharge drum drive sheave 93 is attached to one end of the discharge drum drive shaft 88, as shown in FIG. 8. As shown in FIG. 6, a reversible discharge drum drive motor 87 includes a drive motor sheave 96 for driving a drive belt 90 to impart rotation to the discharge drum 85. As shown in FIGS. 1, 6 and 7, the axis of rotation of the discharge drum 85 is defined by the discharge drum shaft 88. The axis of rotation of the discharge drum 85 lies along the axial center of the path of travel of the cog belt conveyors 21. As shown in FIGS. 6 and 7, the axis of rotation of the discharge drum 85 remains fixed beneath the conveying surfaces of the cog belt conveyors 21.

In operation, the ejection mechanism 80 is used to discharge an object such as the parcel 40 from the upper surface of the cog belt conveyors 21, as shown in FIG. 7. The configuration of the ejection mechanism 80, as shown in FIG. 6, represents the rest state of the ejection mechanism 80. When the ejection mechanism is at rest, as illustrated in FIG. 6, the upper surface 89a of the discharge drum 85 is in the up position, as shown in FIG. 6. In this configuration, the upper surface 89a lies subjacent to the conveying surfaces of the cog belt conveyors 21. Accordingly, an object, such as a parcel 40, may freely travel over the ejection mechanism 80, if desired.

In order to eject the parcel 40 to an adjacent chute 45, as shown in FIG. 7, the discharge drum drive motor 87 is energized when the parcel 40 moves into a position immediately above the ejection mechanism 80. If it is desired that the parcel 40 be discharged to a chute 45 located to the right of the ejection mechanism 80, the discharge drum drive motor is energized so that the discharge drum rotates in a clockwise manner, as shown in FIG. 7. It should be understood, however, that the parcel 40 may be discharged to the chute 45 located to the left of the ejection mechanism 80 by reversing the polarity on the discharge drum drive motor 87 in a manner well known to those skilled in the art.

As shown in FIG. 7, energization of the discharge drum drive motor rotates the discharge drum 85 clockwise or counterclockwise, as desired. As the discharge drum 85 rotates, one of the two convex opposing sides 86a rotates through an arcuate path. The arcuate path begins below a plane defined by the upper surface of the cog belt conveyors 21 and rises above that plane through an opening defined by the space between the cog belt conveyors 21 or between the roller arrays, shown in FIG. 9 and discussed below. The arcuate path then terminates below the plane defined by the surface of the cog belt conveyors 21.

Accordingly, one of the convex opposing sides 86a contacts the lower surface of the parcel 40, as shown in FIG. 7, and lifts the parcel 40 up and away from the surface of the cog belt conveyors 21. The flexible ridges 92 disposed on the surfaces of the convex opposing sides provide contact surfaces to assist in movement of the parcel 40 by increasing friction between the convex opposing side and the parcel 40.

As the discharge drum 85 continues to rotate, the parcel 40 is tilted away from the upper surfaces of the cog belt conveyors 21 and onto an idler roller 46 interposed between the cog belt conveyors 21 and the chutes 45, as shown in FIG. 7. Finally, as the discharge drum 85 completes a full 180 degrees of rotation, the parcel 40 is translated onto the chute 45 and off the conveying surfaces of the cog belt conveyors 21. Accordingly, rotation of the discharge drum 85, as described, lifts, tilts, and translates the parcel 40 from the conveying surfaces of the cog belt conveyors 21, and such rotation returns the discharge drum to a rest position, as shown in FIG. 6.

Figure 9:
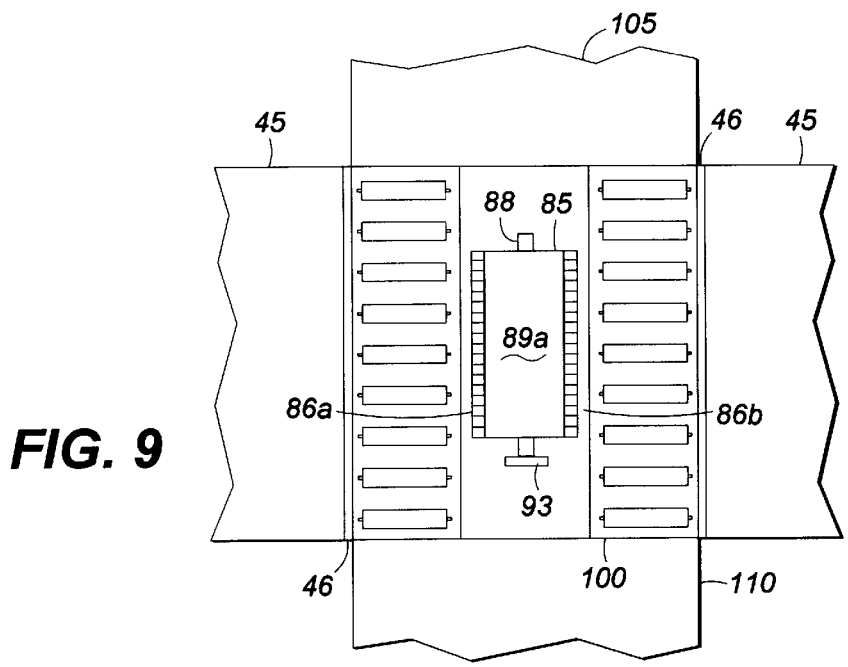
FIG. 9 is a top plan view of a roller bed sorting system embodying the present invention.

As shown in FIG. 9, an alternate embodiment of the present invention provides an ejection mechanism 80 disposed beneath the conveying surface of a roller bed conveyor 100. The roller bed conveyor 100 defines a pair of spaced-apart arrays of rollers. It should be understood that the rollers may be powered or non-powered idler rollers. The rollers define axes of rotation which are transverse to the axis of rotation of the discharge drum 85. The roller bed conveyor 100 and ejection mechanism 80 may be positioned adjacent to desired discharge destinations and interposed between two belt conveyors 105 and 110, or the ejection mechanism and roller bed 100 configuration shown in FIG. 9 may form part of a continuous roller bed conveyor arrangement (not shown).

Figure 11:
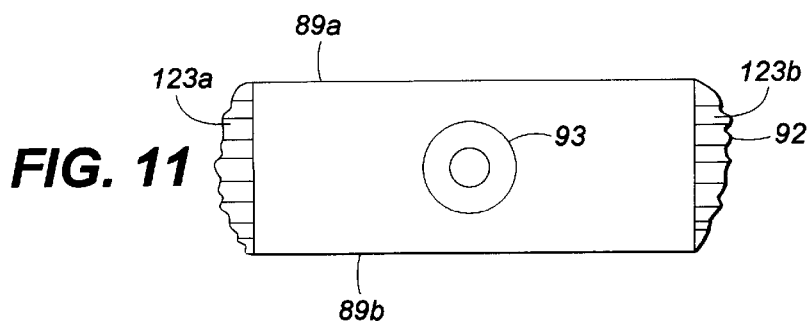
FIG. 11 is a transaxial cross-sectional view of the tapered discharge drum of FIG. 10.

A tapered discharge drum 120 is shown in FIGS. 10 and 11. As shown in FIG. 11, a transaxial cross-sectional view of the tapered discharge drum 120 shows a generally rectangular shaped discharge drum 120, defining convex opposing sides 123a and 123b separated by the longer diameter of the drum. As shown in FIG. 10, the convex opposing sides 123a and 123b of the tapered discharge drum 120 define flexible ridges 126 and are tapered longitudinally, narrowing toward the end having the drive sheave 96 for engagement with the drum drive motor 87 via a drive belt 90, as shown in FIG. 6. As shown in FIG. 1, the tapered discharge drum also tapers longitudinally narrowing in the direction opposite to the of travel of the cog belt conveyors 21. Accordingly, the second end 125 of the tapered discharge drum 120 is wider than the first end 124.

Discharge of a parcel 40 using the non-tapered discharge drum 85, as described above, tends to rotate the parcel 40 as the parcel 40 is being discharged. Rotation of the parcel is a result of the forward movement of the parcel 40 along the cog belt conveyors 21 in concert with the lateral displacement of the parcel 40 by the discharge drum 85. More specifically, as the tapered discharge drum 85 lifts the parcel 40 off one of the cog belt conveyors 21, the other cog belt conveyor continues to urge the parcel in a forward direction, resulting in an unbalanced force that causes rotation of the parcel 40. If desired, the tapered discharge drum 120 may be utilized to counteract rotation of the parcel 40 as it is discharged from the cog belt conveyors 21, as shown in FIG. 7. That is, as a parcel 40 is discharged from the surface of the cog belt conveyors 21 by the tapered discharge drum, the parcel 40 is contacted first by the wider second end 125 of the tapered discharge drum 120 which urges the parcel 40 in a direction counter to the direction of rotation caused by the cog belt conveyor 21. Accordingly, the parcel 40 is discharged from the conveying surfaces of the cog belt conveyors 21 without undesired rotation.

It should be understood the ejection mechanism need not be a drum and that the side of the ejection mechanism that engages the parcels 40 need not be a continuous surface.

The automated sorting system 10 is operated under the control of a digital controller, which may be a programmable logic controller (PLC) or a general purpose microprocessor which is found in a personal computer. Methods for programming such controllers to operate a sorting system of the type disclosed herein are conventional and known to those skilled in the art.

In operation, the number of and location of ejection mechanisms 80 and an identification code for each ejection mechanism 80 are input into the controller memory when movement of the sorting system 10 begins. Parcels 40 are induced sequentially onto the roller bed 50 from the feed conveyor 53, as shown in FIGS. 1 and 2. As shown in FIG. 1, a destination code for each parcel 40 is entered into the controller memory using an optical reader 51, a keypad (not shown), or a voice recognition input device (not shown) before the parcel 40 is directed onto the cog belt conveyor system 20. A suitable optical reader system 51 for imaging the destination code from a label affixed to the parcel 40 is shown in U.S. Pat. Nos. 5,291,564; 5,308,960; 5,327,171; and 5,430,282 which are incorporated herein by reference. The roller bed 50, with herringbone configuration rollers 52, centers the parcel 40 so that the parcel 40 squarely aligns about the longitudinal axis of the cog belt conveyor system 20 and on the surfaces of the cog belt conveyors 21, as shown in FIG. 1.

When the parcel 40 reaches a desired output destination, such as a chute 45 in a position overlying a desired ejection mechanism 80, the PLC energizes the discharge drum drive motor 87 to actuate the ejection mechanism 80. Accordingly, the discharge drum 85 rotates in the direction of the chute 45. As the discharge drum 85 rotates about the discharge drum drive shaft 88, one of the first and second convex shaped opposing sides arcuately translates between the pair of continuous cog belt conveyors 21 and above the upper surface of the continuous cog belt conveyors 21. The discharge drum 85 rotates in the direction of the chute 45, and the parcel 40 is lifted from the surfaces of the cog belt conveyors 21, as shown in FIG. 7. As the discharge drum 85 continues to rotate in the direction of the chute 45, the parcel 40 is tilted on to the idler roller 46, as shown in FIG. 7. Finally, as the discharge drum completes its rotation, as described in detail above, the parcel 40 is discharged onto the chute 45, as shown in FIG. 7. After the parcel 40 is discharged to the chute 45, the discharge drum 85 stops in a rest position, as shown in FIG. 6, and stands ready to discharge a subsequent parcel 40. If it is desired that package rotation be counteracted as the parcel is discharged to the chute 45, a tapered discharge drum 120 may be utilized instead of the discharge drum 85, as described above.

Use of the ejection mechanism 80, as described, allows the parcel 40 to be discharged from the surfaces of the cog belt conveyors 21 independent of the speed of the parcel 40 moving along the cog belt conveyors 21. Additionally, interaction of the flexible ridges 92 disposed along the surfaces of the convex opposing sides of the discharge drum 85 or the tapered discharge drum 120 reduces noise created by the impact of the discharge drum 85 with the overlying parcel 40. Advantageously, failure of an individual ejection mechanism 80, or the cessation of use of an individual ejection mechanism 80 for the maintenance purposes does not create downtime for the cog belt conveyor system 20. In the event of the cessation of use of an individual ejection mechanism 80, the PLC may direct parcels to be discharged to alternate discharge destinations and bypass the stopped ejection mechanism 80. Furthermore, the discharge drums may be quickly and easily replaced. Accordingly, downtime of the cog belt conveyor system 20 is reduced.

Reference is now made to FIGS. 12–37 in discussing the general concept of providing a relatively narrow package-ejecting disc, which can be used within a gap defined by two conveyor belts or other conveying item. As will be discussed in detail further below, the disc can be substantially round in shape, or can include a "flat spot", and can also either be of substantially unitary construction or multi-segmented.

Figure 12:
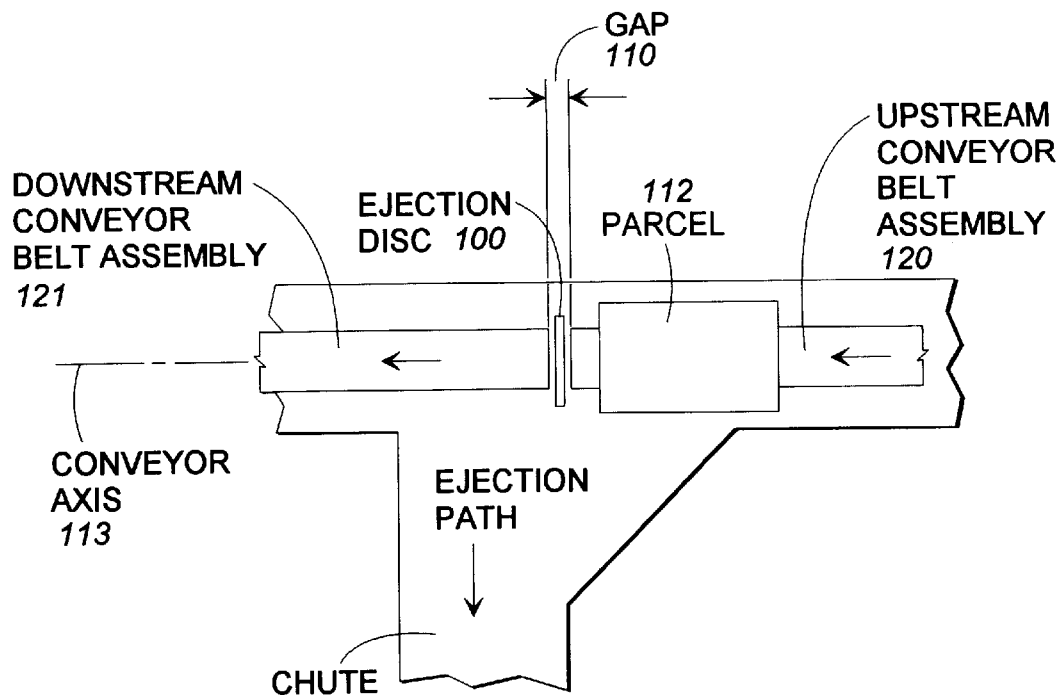
FIG. 12 is a top plan view of a portion of a conveyor system according to the present invention, illustrating an ejection disc 100 located between upstream and downstream conveyor belt assemblies 120, 121, respectively. A parcel 12 (also known as a package 12) is shown approaching the ejection disc 100. If the ejection disc 100 ejects the parcel 112, the parcel will be urged into the area of a side chute 114. If the ejection disc 100 does not eject the parcel 112, the parcel will be passed from upper conveyor belt assembly 120 to lower conveyor belt assembly 121.
Figure 13:
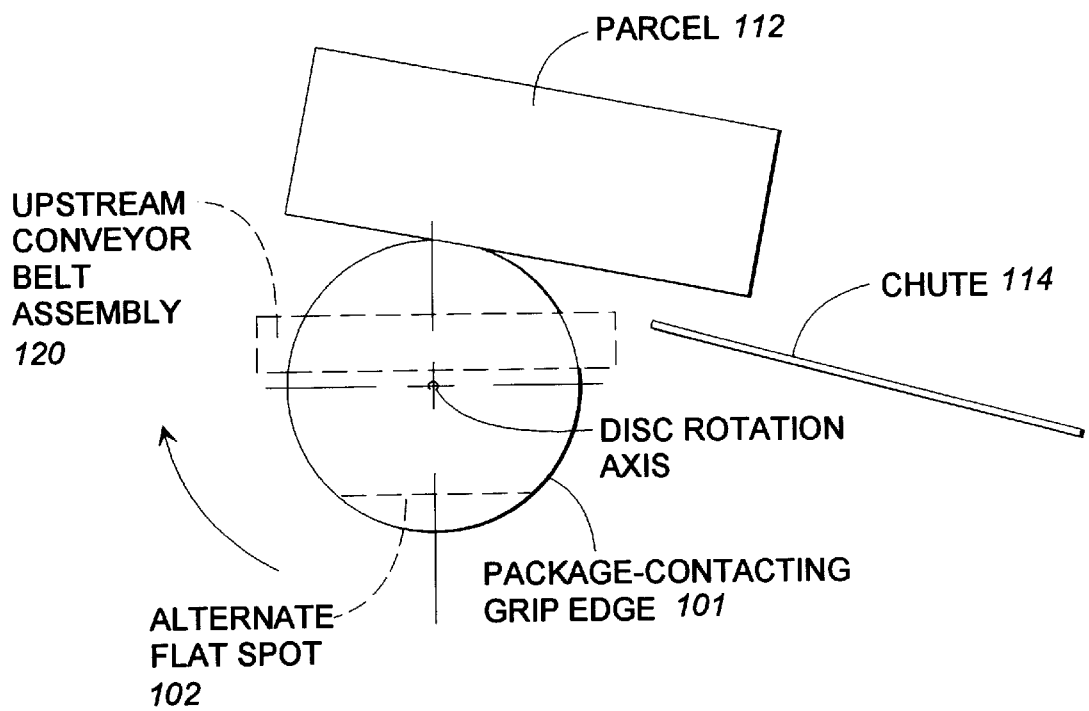
FIG. 13 is an "upstream" illustrative sectional view of the configuration of FIG. 12, looking along the conveying axis, showing an ejection disc 100 ejecting a package to the viewer's right. The ejection disc 100 is shown in round solid line outline, although as shown by the dotted line a flat spot 102 is included which exists if a truncated section is provided as discussed later.

Reference is first made to FIGS. 12 and 13 in order to explain the general narrow package-ejecting disc concept. FIG. 12 is a top plan view of a portion of a conveyor system according to the present invention, illustrating an ejection disc 100 located between upstream and downstream conveyor belt assemblies 120, 121, respectively, and rotatably driven about an axis 105. FIG. 13 is an "upstream" sectional view taken generally along the conveying axis, showing an ejection disc 100 ejecting a package to the viewer's right.

As shown in FIGS. 12 and 13, the parcel 112 is moved along a generally straight conveyor axis 113, being first positioned atop an upstream conveyor belt assembly 120, and is conveyed towards and onto a second downstream conveyor belt assembly 121, unless it is ejected. An ejection disc 100 is rotatably located within a relatively narrow transverse "slot" or "gap" 110 intermediate the two belts of the two assemblies 120, 121 to provide the ejection. It should be understood that the gap is substantially narrow in that it is shorter along the conveying dimension that in its transverse, perpendicular dimension.

A side chute 112 is positioned at approximately 90 degrees relative to the conveying axis 113, and received ejected packages.

In FIG. 12, a parcel 12 is shown in approaching the ejection disc 100. If the ejection disc 100 ejects the parcel 112, the parcel will be urged into the area of a side chute 114. If the ejection disc 100 does not eject the parcel 112 as shown in FIG. 13, the parcel is passed from the upstream conveyor belt assembly 120 to the downstream conveyor belt assembly 121. As may be seen, the two conveyor belts within the two conveyor belt assemblies include substantially planar upper conveying surfaces, which lie substantially along the same horizontal plane.

As shown in FIG. 13 and as discussed in detail elsewhere, the disc 100 can be round or may include a truncated section defined in part by a flat spot 102. In either case, the peripheral edge 101 of the ejection disc 100 is brought into contact with the underside of the package as discussed later, such that the parcel is discharge to the viewer's right as viewing FIG. 13.

The gap 110 can be thought of as having a thickness defined by the closest distance shown between the two conveyor belts, and can be thought to extend above, below, and to intersect the conveying axis.

FIGS. 14–17 illustrate the use of a ejection disc 200 with a flat spot defining a truncated section. Under this concept, a "truncated", disc is used which fits within the transverse slot defined by the end of one belt conveyor and the beginning of a second, downstream belt conveyor. This disc includes a truncated section which operates much the same way as the "truncated" drum described earlier. The truncated disc is rotatably mounted on a fixed axis, and selective rotation causes the disc to engage and eject a package, when rotation is suitably timed.

Figure 14:
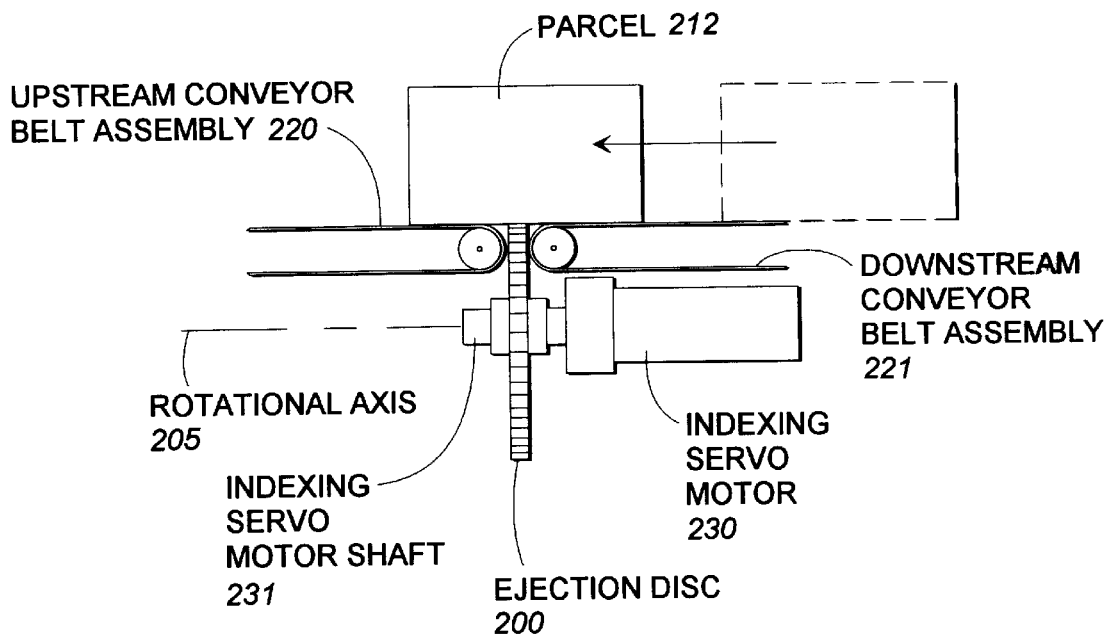
FIG. 14 is a side elevational view of a portion of a conveying configuration according to the present invention. A package 212 is moved from conveyor belt assembly 220 to a downstream conveyor belt assembly 221. As may be seen, the two conveyor belts include substantially planar upper conveying surfaces, which lie substantially along the same horizontal plane. A first embodiment of an ejection disc 200 is positioned intermediate the two belts, and is configured such that its selective rotation causes a portion of the disc to be moved upwardly into the path of the package (preferably from below the package), such that the package is discharged sidewardly relative to the two conveying belts.

Reference is now made to FIG. 14, which is a side elevational view of a conveyor configuration according to the invention. A package 212 can be moved from an upstream conveyor belt assembly 220 to a downstream conveyor belt assembly 221, unless ejected by a ejection disc 200 as described below. As may be seen, the two conveyor belts within the two conveyor belt assemblies 220, 221, include substantially planar upper conveying surfaces, which lie substantially along the same horizontal plane.

As in the configuration of FIGS. 12 and 13, the ejection disc 200 is positioned within and rotates within a transverse gap 210 intermediate the two belts assemblies 220, 221.

Figure 15:
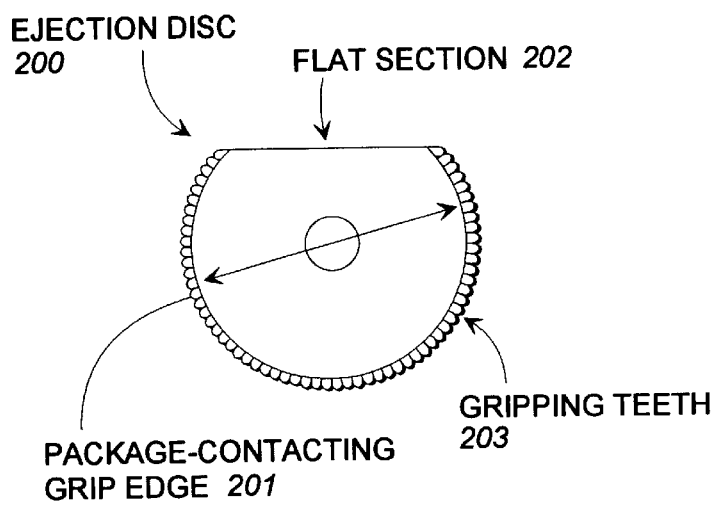
FIG. 15 shows an isolated view of the 12" diamater ejection disc 200 as viewed from its downstream side and a flat section 202. As may be seen, when the ejection disc 100 is in its normal position, the flat section allows passage of the package. However, when the ejection disc 200 is rotated, the curved peripheral edge 201 of the ejection disc 100 rises above the conveying surface, causing interference with a package moving along its conveyor path and preferably discharging the package.

As shown in FIG. 15, the ejection disc 200 includes a flat section 202. When the disc 200 is in its unengaging or "neutral" position as shown in FIG. 14, the flat section 202 allows passage of the package. Otherwise, the disc 200 is at least partially in the conveyor path.

Figure 16:
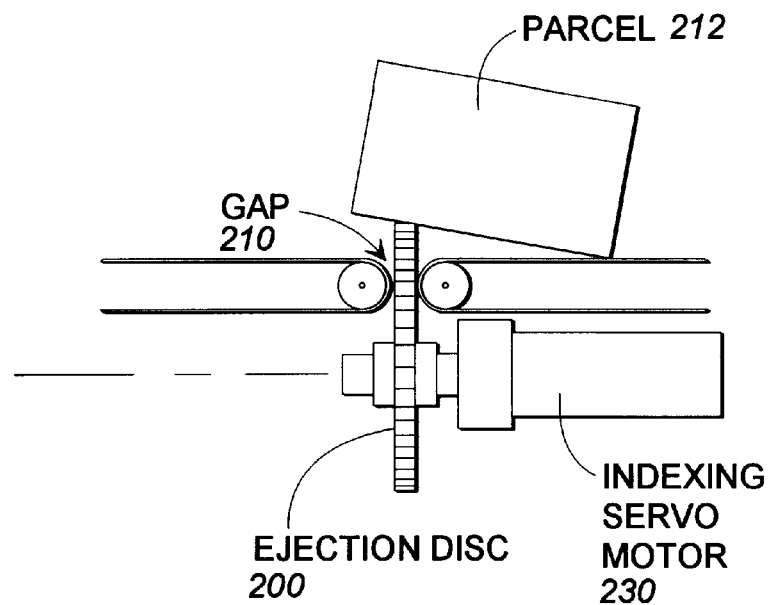
FIGS. 16 and 17 are views similar to FIGS. 14 and 15, respectively illustrate what happens when the ejection disc is rotated 180 degrees about its rotational axis from that shown in FIGS. 14 and 15. As may be seen, when the ejection disc 200 is actuated through such rotation, its curved edge (having a grip surface) rises above the conveyor surface, causing the package to be lifted. As the ejection disc 200 is likewise rotating, this engagement causes the package to encounter a force substantially 90 degrees in relation to the conveying axis of the package.
Figure 17:
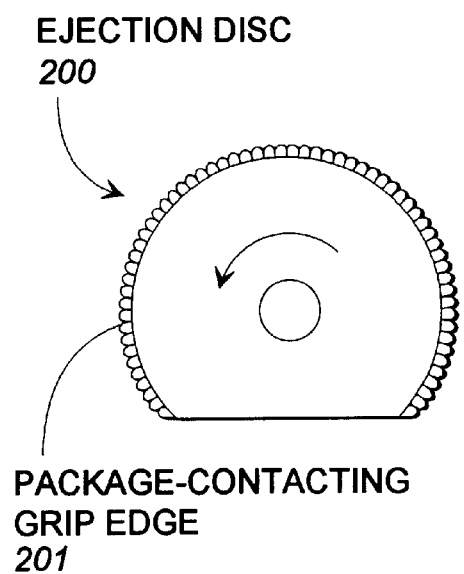

FIGS. 16 and 17 illustrate what happens when the ejection disc is rotated 180 degrees about its rotational axis 205 from that shown in FIGS. 14 and 15. As may be seen, when the ejection disc 200 is actuated through rotation, its curved portion (having a gripping surface) rises above the conveyor surface, causing the package to be lifted. As the disc is likewise rotating, this engagement causes the package to encounter a force substantially 90 degrees in relation to the conveying axis of the package moving from upper conveyor belt assembly 220 to upper conveyor belt assembly 221.

As noted above, the ejection disc 200 is rotatably mounted relative to the conveying path of the packages in contacts. This rotational axis, in the configuration shown in FIGS. 14–17, is substantially stationary, horizontal, and parallel to the conveying axis of the packages above, although slight variations may be provided as needed. The conveying axis lies substantially along a drive shaft 231 which is rotatably driven by an indexing servo motor 230. This indexing servo motor is configured to be selectively activated to rotate the disc 200 in either rotational direction, allowing ejection to be provided to either side of the conveying axis.

In one preferred embodiment shown in FIGS. 15 and 17, the outer edge of the ejection disc includes a plurality of teeth 203, which are in one preferred embodiment comprised of rubber.

It should also be understood that alternative configurations, which include chain or other drives allowing for the remote location of an indexing motor are contemplated under the spirit and scope of the present invention.

Figure 18:
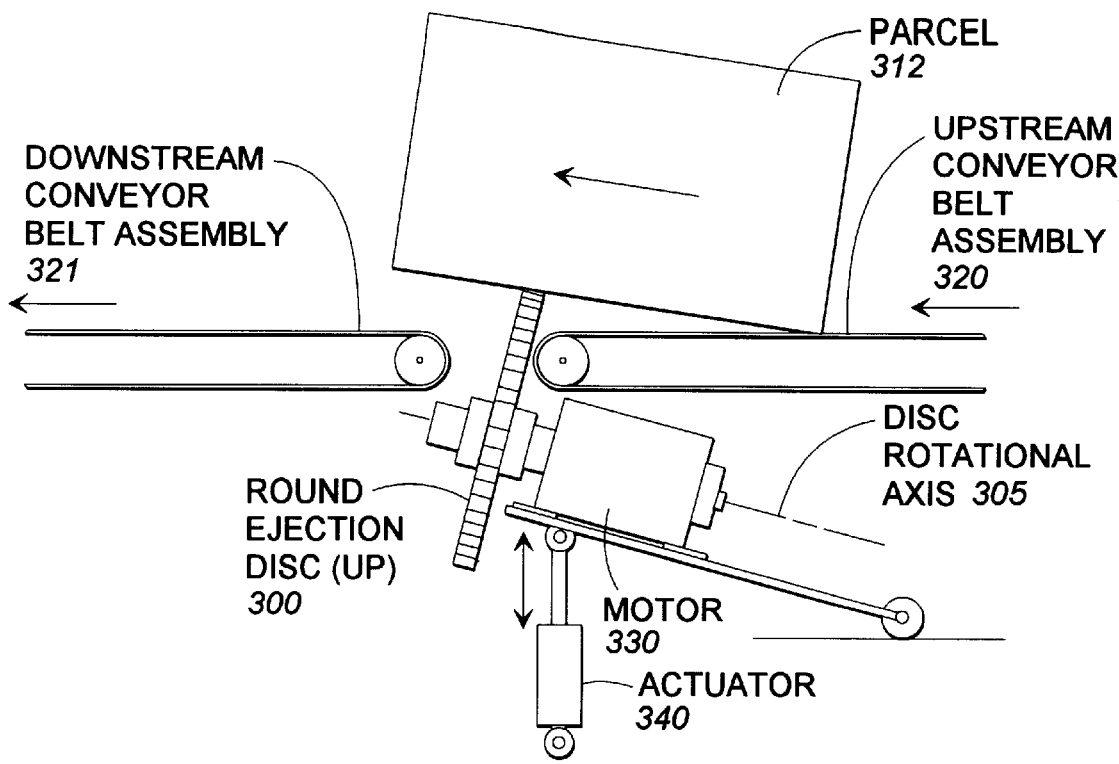
FIG. 18 is a side elevational view of a second disc embodiment of the present invention, illustrating a parcel 312 being passed from an upstream conveyor belt assembly 320 towards a lower conveyor belt assembly 321. An ejection disc 300 is shown contacting the underside of the package 312, being indexed upwardly by use of an actuator 340, which actuates a pivoting support member 333, which supports a motor 330, which rotatably drives a shaft 331, which is substantially rigidly attached to the ejection disc 300.
Figure 19:
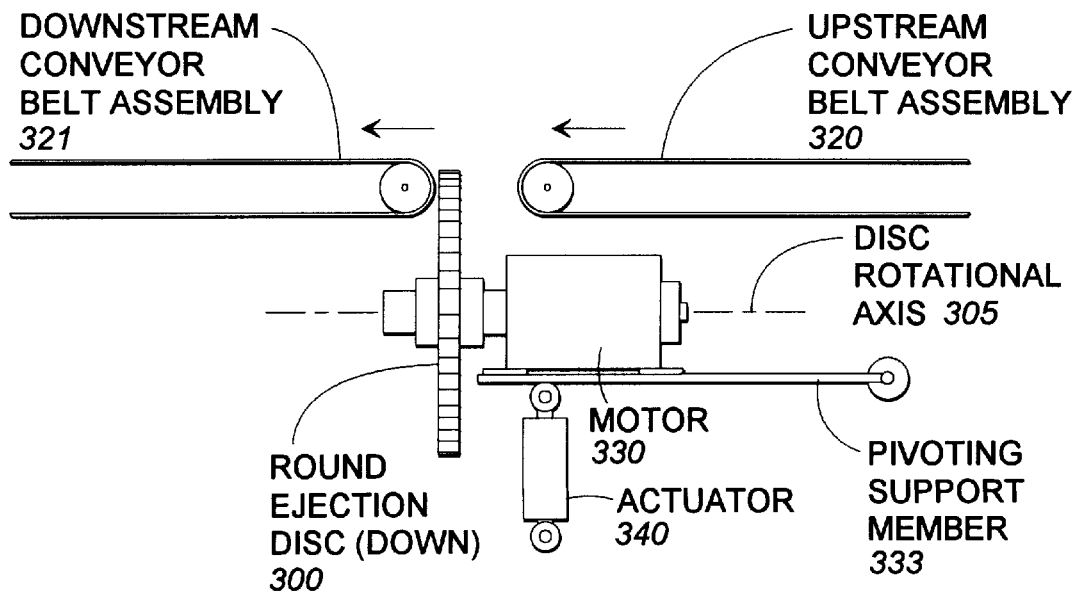
FIG. 19 is a view similar to that to FIG. 18, except no package is shown, and the ejecting disc 300 is in its "neutral" or "withdrawn" position.

Reference is now made to FIGS. 18 and 19, which illustrate the use of a round ejection disc 300 which is indexed upwardly above the conveying surface within the gap 310 between two conveyors by use of a pivoting action.

This configuration includes a round ejection disc 300 mounted to a shaft which is rotatably driven by a motor 330. The motor 330, which can be continuously running if desired, is mounted to a pivoting support member 333 which is pivotably mounted relative to a stationary conveyor frame member (not shown). This pivoting support member 333 is pivotably mounted about a pivoting axis which is substantially horizontal as well as transverse to and below the package conveying axis path.

A linear actuator 340 is provided which actuates the frame member 333, the motor 330, and the disc 300 from a retracted (non ejecting) position (see FIG. 18) to an extended (ejecting) position (see FIG. 19).

As may be seen, when the actuator 340 (which may be an air or other extendable cylinder) urges the disc 300 upwardly, the rotational axis 305 goes from being substantially horizontal to inclined. Hydraulic, pneumatic, or other suitable actuation means known in the art can be used.

Figure 21:
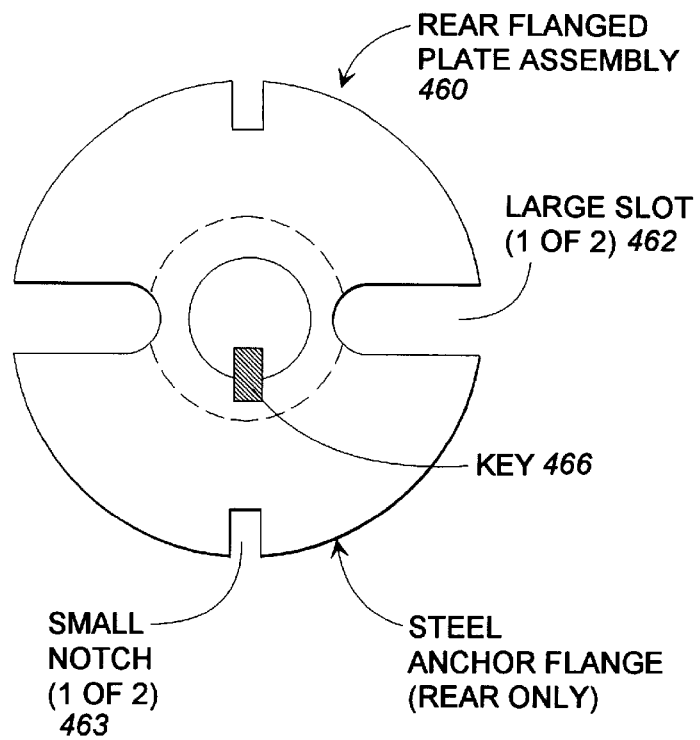
FIG. 21 is a front end view of a rear flanged plate assembly 460 used in the FIG. 20 configuration.
Figure 22:
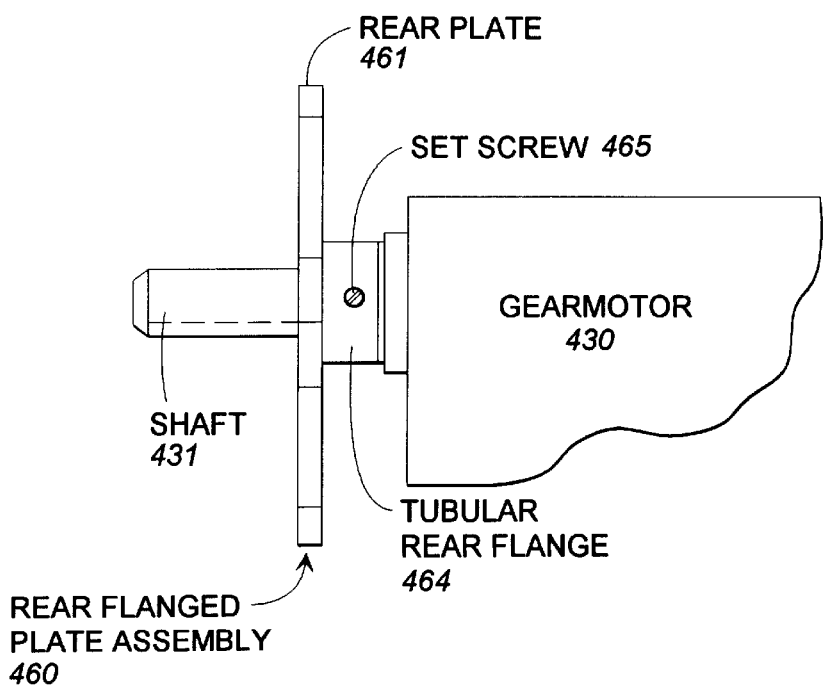
FIG. 22 is a side elevational of a motor 430 having a shaft 431 having a rear flanged plate assembly 460 mounted thereon.

The narrow, substantially circular, ejection disc 300 fits within the transverse "slot" 310 defined by the end of an upstream belt conveyor assembly 320 and a downstream and the beginning of a second, downstream belt conveyor assembly 321. The circular disc 300 is rotatably mounted on a movable rotational axis 305. While in its "neutral" position as shown in FIG. 22, the disc 300 does not contact the packages as they pass from the upstream to the downstream conveyor. However, when actuated, the disc 300, being moved upwardly to its "engaging" position shown in FIG. 21, contacts the package on its circular edge. Rotation of the disc causes the package to be discharged sidewardly.

The above motor 330 can be reversible to allow for discharge to either side of the conveyor. If desired, the motor can be left continuously running allowing the actuator to determine when ejection occurs. The motor 330, as with all the motors described in this application can be selected as known in the art.

This concept, shown generally in FIGS. 20–37, generally relates to the use of a "quick change" feature which allows the narrow discs be quickly removed and replaced with little or no tools and with minimal disturbance to adjacent machinery. This is very important to those operating and maintaining said machinery, in that downtime due to repairs are desired to be at a minimum.

FIGS. 20–28 show a first multi-segment embodiment, with a multi-segmented ejection disc 400.

FIGS. 29–35 show a second multi-segment embodiment, including a multi-segmented ejection disc 500.

Figure 36:
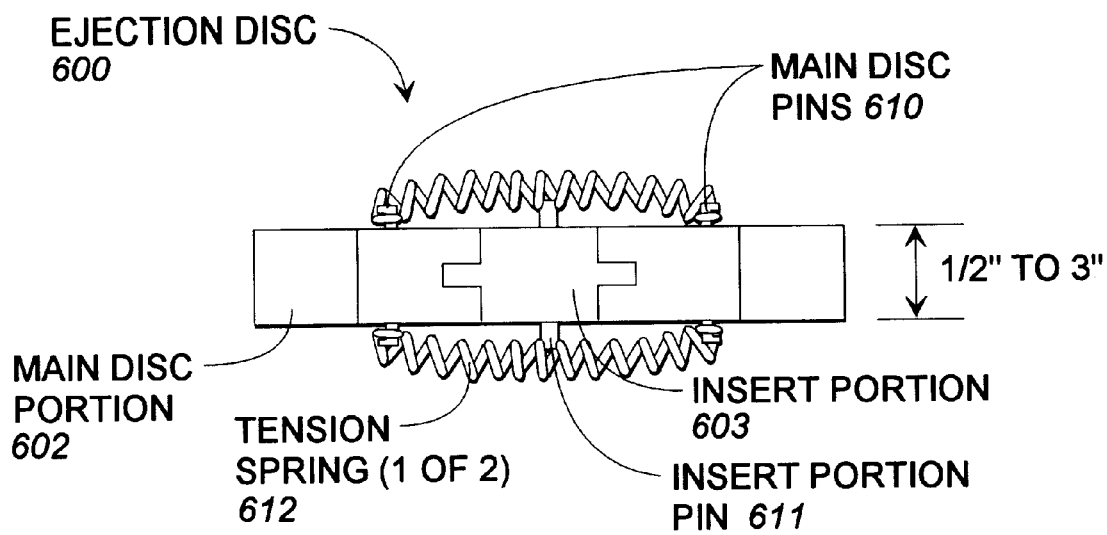
FIGS. 36 and 37 illustrate top plan and side elevational views, respectively of third multi-segmented ejection disc 600 according to the present invention. In this particular embodiment, the multi-segmented disc includes a "flat spot", although as shown elsewhere in this application such a multi-segment disc could not have a flat section.
Figure 37:
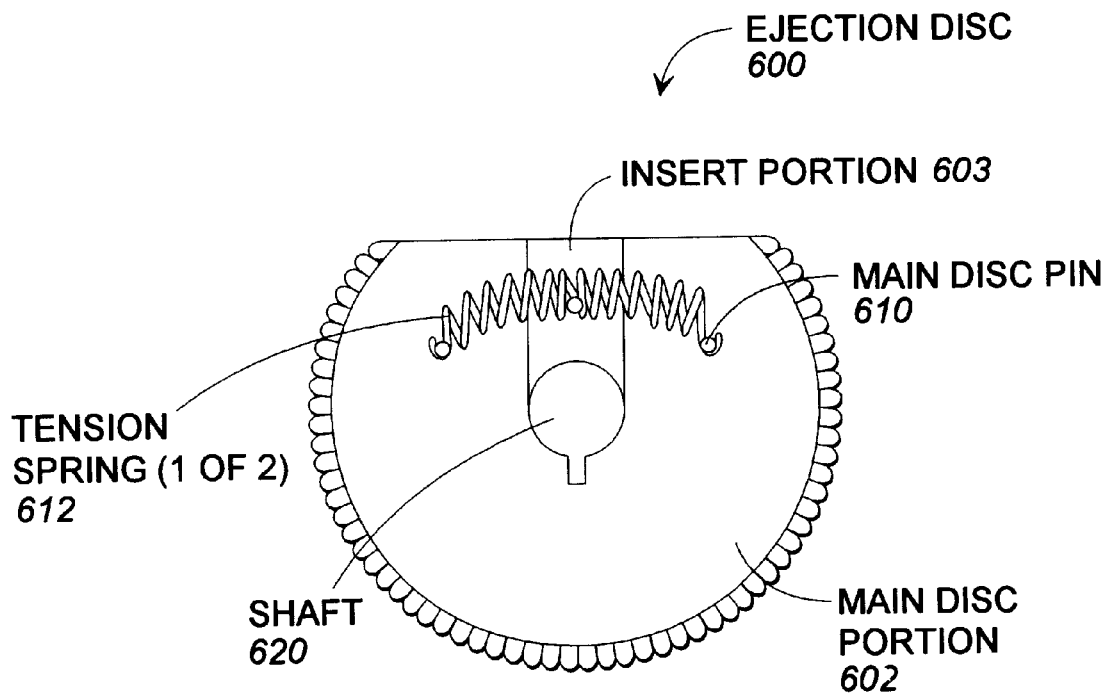

FIGS. 36–37 show a third multi-segment embodiment, including a multi-segmented ejection disc 600.

FIGS. 20–28 show a first multi-segmented disc embodiment, including a multi-segmented ejection disc 400 which generally includes a pair of half wheel segments 402, which are captured between a front plate 450 and a rear flanged plate assembly 460 and maintained in place by use of a tension spring 470, to form a substantially circular ejection disc 400, although a wheel with a flat spot is readily contemplated.

Figure 20:
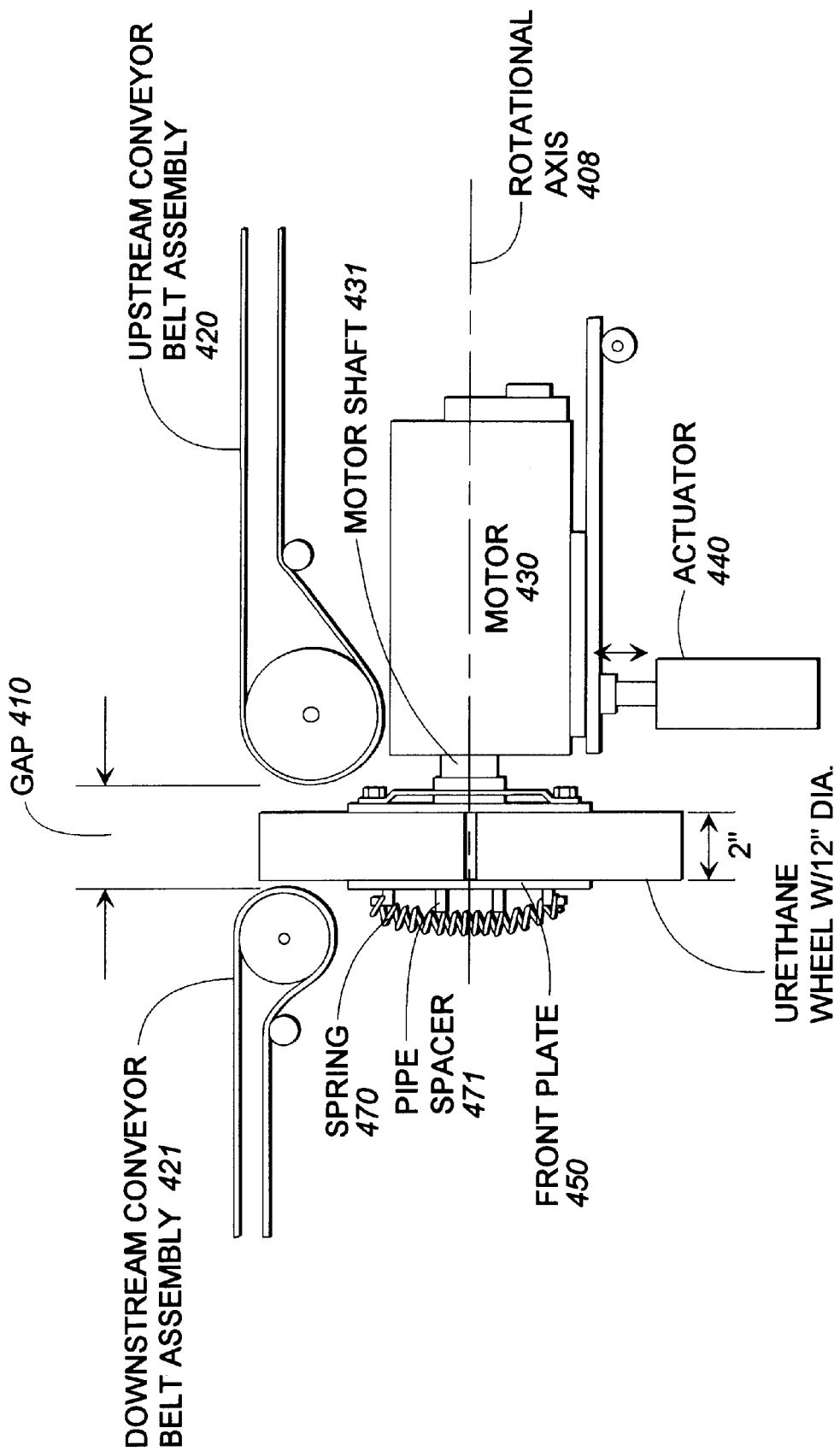
FIG. 20 is a side elevational view illustrating a first multi-segmented disc embodiment, round ejection disc 400 in position between upstream and downstream conveyor belt assemblies 420, 421, respectively. The ejection disc is mounted to a shaft which is rotatably driven by a gear motor 430. The gear motor is mounted to a frame member which is pivotably mounted about an axis P, and actuated about that axis by an actuator 440. The actuator has essentially two positions, the "ejecting position", and a "retracted" position which is known in FIG. 20.

FIG. 20 illustrates the multi-segmented round ejection disc 400 in position within a gap 410 between upstream and downstream conveyor belt assemblies 420, 421, respectively. The ejection disc 400 is mounted to a shaft 431 which is rotatably driven by a gear motor 430. The gear motor 430 is mounted to a pivotable support member 433 and actuated about pivoting axis by an actuator 440. The pivotable support member 433 is pivotably mounted relative to an unshown stationary frame member about a pivoting axis which is substantially horizontal as well as transverse to and below the package conveying axis path.

The actuator 440 has essentially two positions, an "ejecting position", and a "retracted" position, and is configured to operate such that the multi-segmented ejection disc 400 can be raised generally upwardly and downwardly within the gap 410 much as the disc 300 moved as shown in FIGS. 18 and 19.

For discussion purposes, the configuration will be assumed to have a "front" and a "back", although such terms are not to be construed as being limiting. The "front" of the ejection disc 400 is the part oriented to the viewer's left as viewing FIG. 20.

As shown in FIG. 22, attached to the shaft 431 of the motor 430 is a rear flanged plate assembly 460, which includes a rear plate 461, a rear flange 464, and a set screw 465. As shown in FIG. 21, the rear plate 461 includes two opposing large slots 462, and also includes two small notches 463. The large slots 462 are oriented approximately 90 degrees from the opposing smaller notches 463. The rear flange 464 is substantially rigidly attached to the rear plate 461, by welding or other means known in the art. The set screw 465 allows for attachment of the rear flange 464 to the shaft 431, as known in the art.

Figure 23:
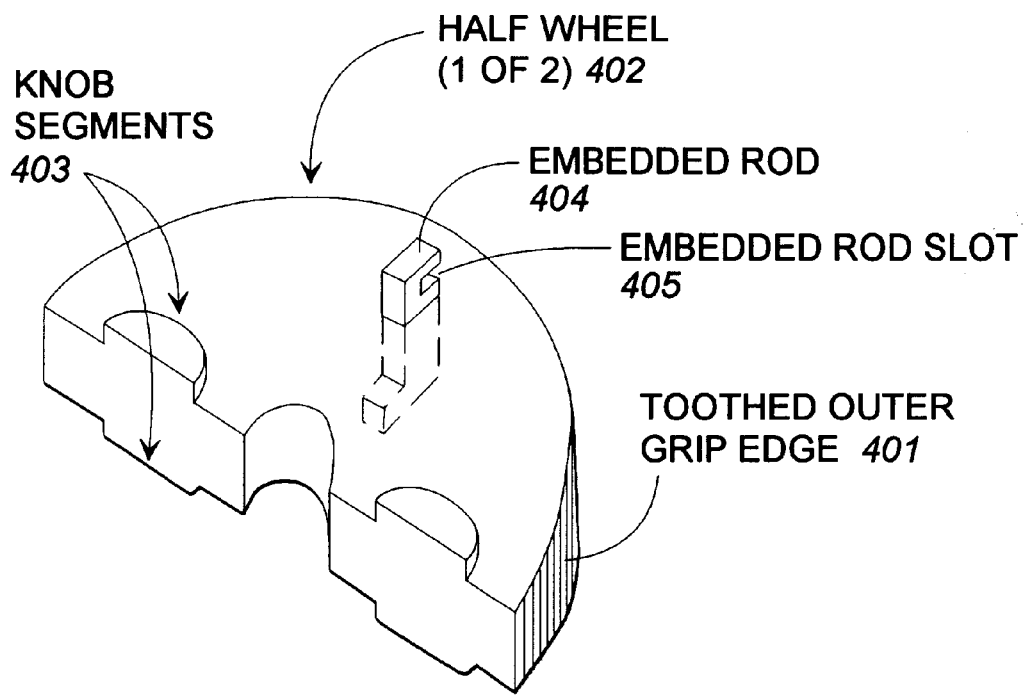
FIG. 23 is a pictorial view of a half wheel segment 402 of the FIG. 20 configuration, configured mostly of molded urethane in one embodiment. This half wheel segment 402 includes an embedded metal rectangular rod 404.

Reference is now made to FIG. 23, which is a pictorial isolated view of a half wheel member 402, two of which are used for each disc 400. Each of the half wheel members 402 includes a corresponding embedded rod 404. At the front end of each embedded rod is defined in embedded rod slot 405 or other suitable engaging means, and at the opposite, rear, end is an embedded rod hook 406 or other suitable engaging means. As described elsewhere in this application, the embedded rod slots 405 are each configured to accept one end of a tension spring 470, and the embedded rod hooks 406 are configured to pass through slots 463 of the rear flange plate 461, and engage the rear side of the rear flange plate 461.

Each of the half wheel members 402 is configured mostly of molded urethane in one preferred embodiment with the exception of the metal embedded rod 404. In one preferred embodiment, the rods 404 have a rectangular transverse cross section.

Figure 24:
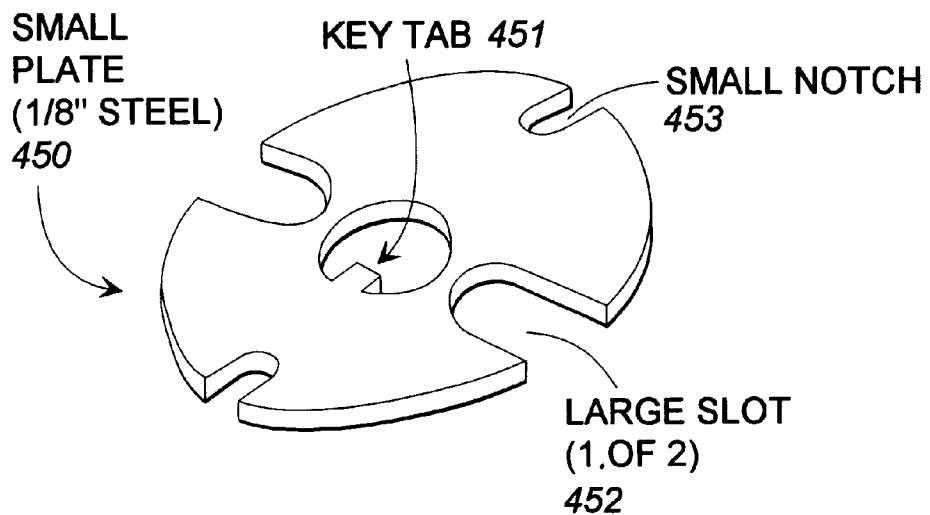
FIG. 24 is a pictorial view of a front steel plate of approximately 1/8 inch in thickness. This front plate includes a two large slots 452, and two opposing small notches 453.

Reference is now made to FIG. 24, which is an illustration of a front steel plate 450 of approximately ⅛ inch in thickness. This front plate includes two opposing large slots 452, and two opposing small notches 453. The opposing large slots 452 and two opposing small notches 453 of the steel front plate 450 are similar in configuration to those provided in the rear plate 461 of the rear flange plate assembly 460.

Figure 27:
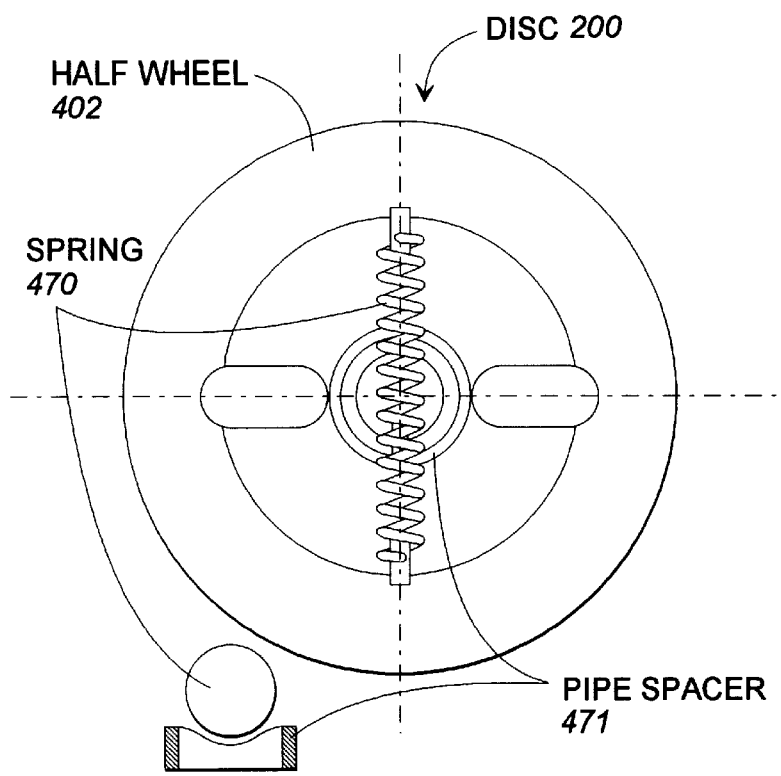
FIG. 27 is a front end view of the first multi-segmented disc 400 embodiment, showing the spring 470 and a pipe spacer in place.
Figure 28:
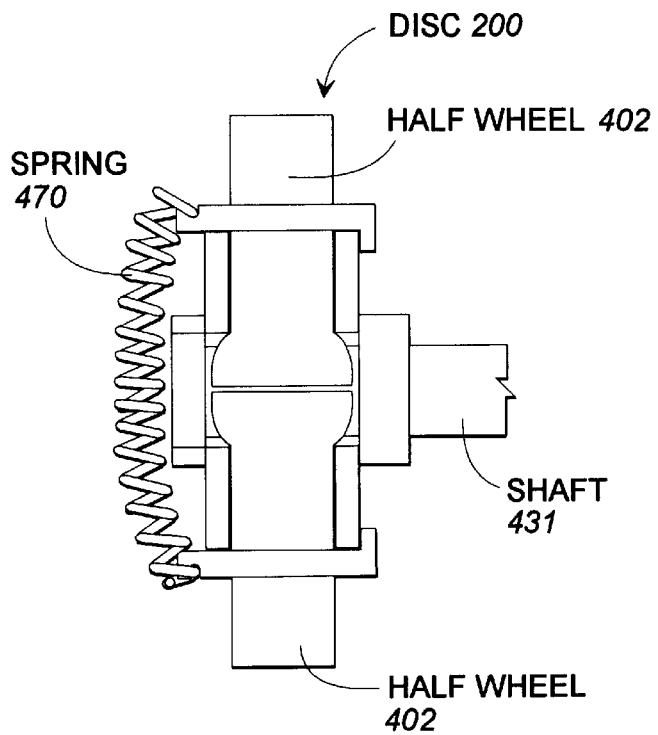
FIG. 28 is a right side elevational view of that shown in FIG. 27.

As shown in FIGS. 27 and 28, a tension spring 470 and a "pipe" 471 are also included. A key 466 is used to provide a keyed connection as described later.

As shown in FIG. 22, the rear flanged plate assembly 460 is mounted to the shaft 431 of the gear motor 430, by passing the collar-shaped rear flange 464 over the substantially circular outline of the shaft 431. When the rear flange 464 is positioned at its desired location, a set screw 465 is installed in order to fix the rear flange 464 to the shaft 431 of the gear motor 430. A key as known in the art provided a keyed engagement between the rear flanged plate assembly 460 and the shaft 431.

Figure 25:
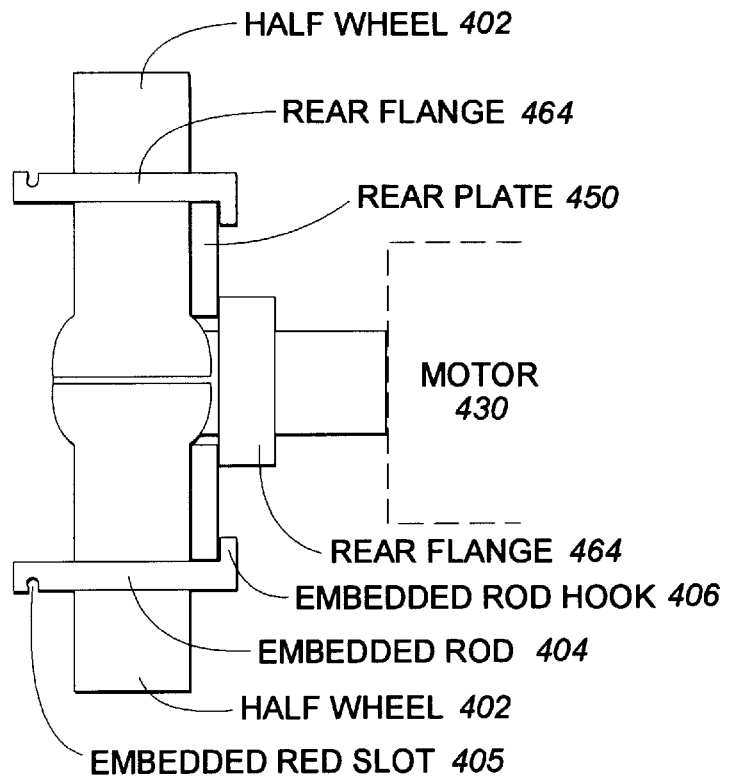
FIG. 25 is a right side elevational view of the first multi-segmented disc configuration, with two half wheel segments 402 installed thereon. No front plate or associated hardware is yet in place.

After the rear flanged plate assembly 460 is mounted to the shaft 431, the two half wheel members 402 are situated as shown in FIG. 25, and held in place by the use of a front plate 450 as shown in FIG. 27.

Figure 26:
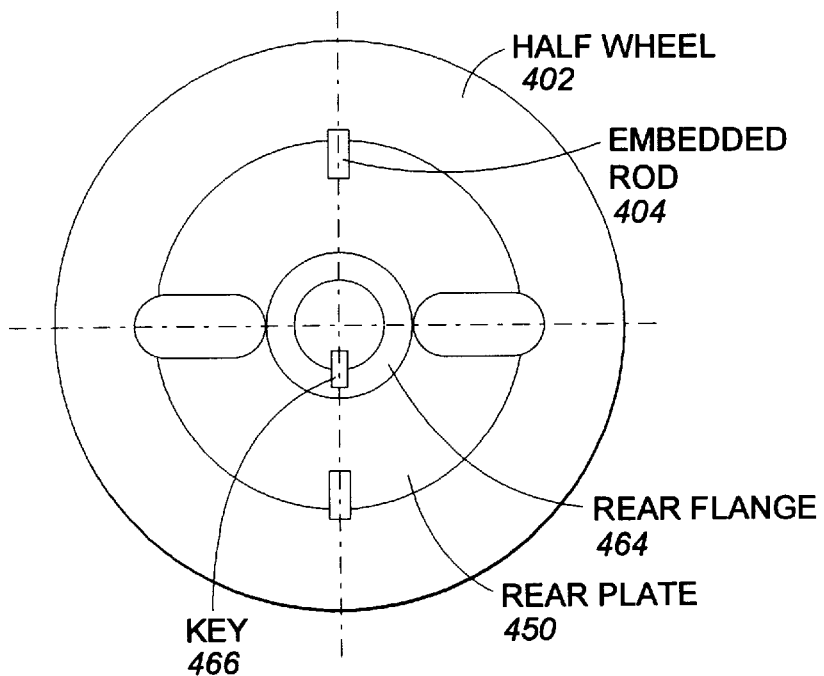
FIG. 26 is a rear elevational view of that shown in FIG. 25, with the motor not shown.

When the two half wheel members 402 are in place as shown in FIG. 26, it may be seen that the half knob segments 403 of the half wheel members 402, combine to provide substantially elliptically-shaped knobs, shown well in FIG. 26. These knobs are partially contained by the large cut outs of the front plate 450, which serves to capture the half wheel members 402 between the front plate 450 and the rear plate 461 of the rear flange plate assembly 460.

When installed, the embedded rods 404 of the half wheel members are configured such that their hooks 406 are engaged with the "rear" side of the rear flange plate 461, as shown in FIGS. 25 and 26.

After positioned as shown in FIG. 25, the front plate 450 is positioned into place as shown in FIG. 27. As may be understood, the front plate is placed relative to the half wheels and their embedded rods 404, such that the front ends of the embedded rods pass through the small notches 453 of the front plate 450.

After the front plate 450 is in place, a tension spring 470 is stretched such that its two ends engage respective slots 405 in the front ends of the embedded rods 404, such that the spring ends are engaged with the respective embedded rod slots 405. However, before the spring 470 is situated into place, a pipe spacer 471 is placed in engagement with the front plate 450. The spring is then positioned into place, such that the spring is engaged at its ends with the embedded rods, and the medial portion of the spring 470 biases radially against the end of the substantially short pipe spacer 471, which biases inwardly onto the front plate 450.

As shown in FIG. 27, a curved portion is provided in the pipe spacer to accommodate the round nature of the spring, and to discourage removal of the pipe spacer.

The pipe spacer 471, in one preferred embodiment, fits about the end of the shaft 431 of the gear motor 430. This engagement, combined with the biasing of the spring, tends to maintain the pipe spacer in place.

A key 466 as known in the art to provide suitable engagement between the rear flange 464 and the shaft 431, to discourage rotation therebetween.

Operation of the configuration shown in FIGS. 20–28 is similar to that discussed in reference to FIGS. 18 and 19. A motor 430 is used which drives the ejection disc 400, such that when the motor 430 and rotating disc 400 is pivoted upwardly by an actuator 440, the ejection disc engages and discharges packages passing gap 410.

Although this configuration includes the use of an pivoting configuration, if a flat spot is provided in one or both of the half wheels 402, as may be understood, no pivoting is required; the motion will be as described earlier with respect to FIGS. 14–17.

In order to change a wheel configuration, a user will disengage the spring 470 from its location, remove the pipe spacer 471, remove the front plate 450, and remove and replace as needed either or both of the half wheels 402. The front plate 450 is then positioned as shown in FIGS. 27 and 20, and the pipe spacer 471 and spring 470 are situated into place as shown in FIGS. 20, 27, and 28.

As noted above, although the multi-segmented ejection disc 400 is shown as having a circular gripping perimeter edge, a truncated portion could also be provided by providing such a truncation in at least one of the half wheel segments 402.

FIGS. 29–35 show a second multi-segment disc embodiment 500, including a main disc portion 502, an insert portion 503, and a spring 512.

Figure 32:
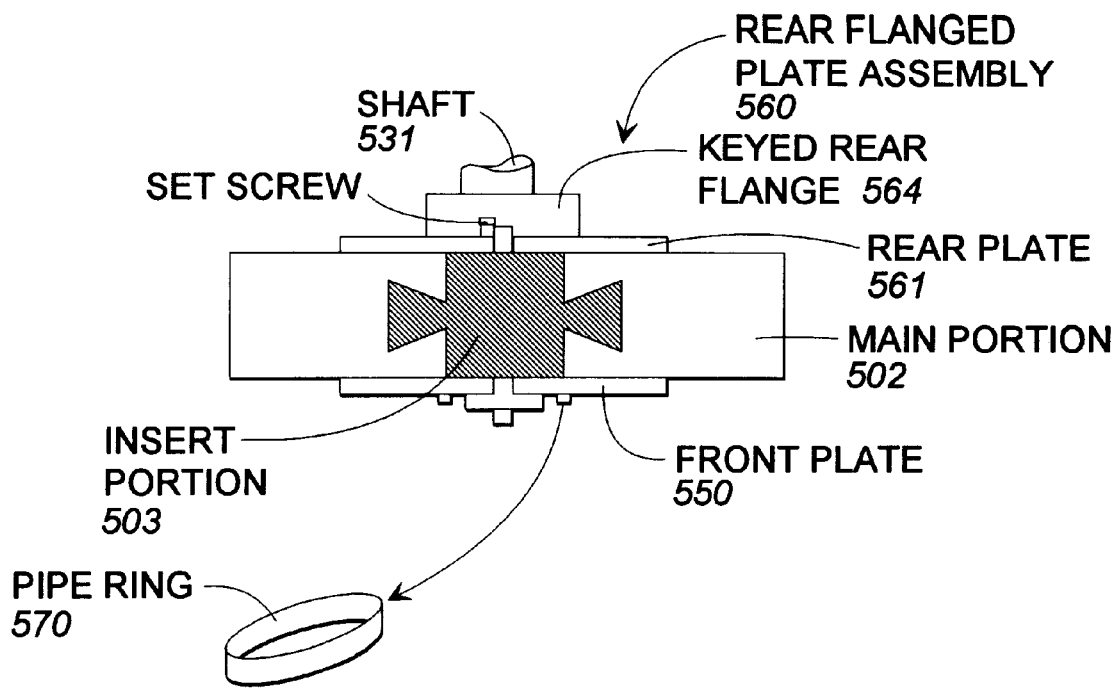
FIG. 32 is a top plan view of the second multi-segmented wheel embodiment according to the present invention, illustrating the beveled interconnection between the insert portion 503 and a main disc portion 504. Also shown is the capturing provided by the front plate 550 and the rear flange plate assembly 560. Finally shown is a pipe ring 513 which can be placed on the front side of the front plate.

The configuration of FIGS. 29–35 includes a multi-segmented urethane wheel. The wheel portion which contacts the package takes the form of two urethane segments, a main disc portion 502 and an insert portion 503. The main disc portion 502 includes a large slot therein, and the smaller insert portion is configured to slide within the slot of the main disc portion. As shown in FIG. 32, this insert can include a beveled configuration, which tends to provide engagement between it and the main wheel portion. These urethane members 502, 503, are drawn together by the use of a tension spring 512, which has each of its ends engaging one of the headed portions of embedded steel pins.

Figure 29:
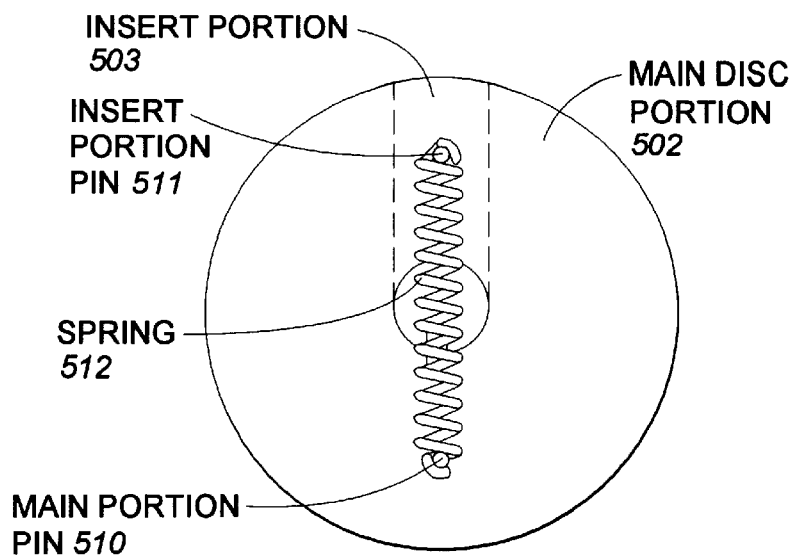
FIG. 29 is a front end illustrative view of a second multi-segmented wheel embodiment, shown in round configuration.
Figure 30:
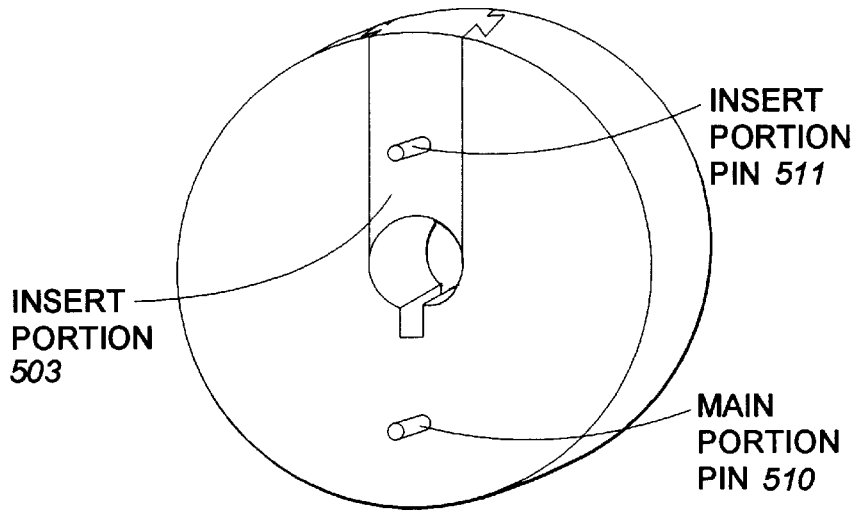
FIG. 30 is a pictorial view of that shown in FIG. 29, except no tension spring is shown.
Figure 31:
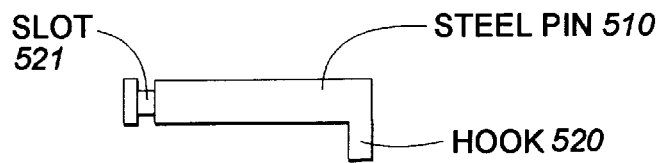
FIG. 31 is a side illustrative view of a portion of the main disc portion 502 of the FIG. 30 configuration, showing a steel pin such as 510 in detail.

As shown in FIGS. 29 and 30, the main disc portion 502 includes an embedded pin 510. The embedded pin includes a rear hook 520, and includes a front "headed" portion which defines an annular slot 521.

The main disc portion 502 also includes an insert-receiving slot which at its end includes a substantially arcuate portion having a keyway slot therein. The keyway slot is configured to accept a key as described elsewhere.

The insert portion 503 includes an insert portion pin 511 similar in configuration to pin 510 of the main portion 502. The insert portion 503 includes an arcuate end, which is configured to conform substantially to a peripheral portion of a shaft as described elsewhere.

Figure 33:
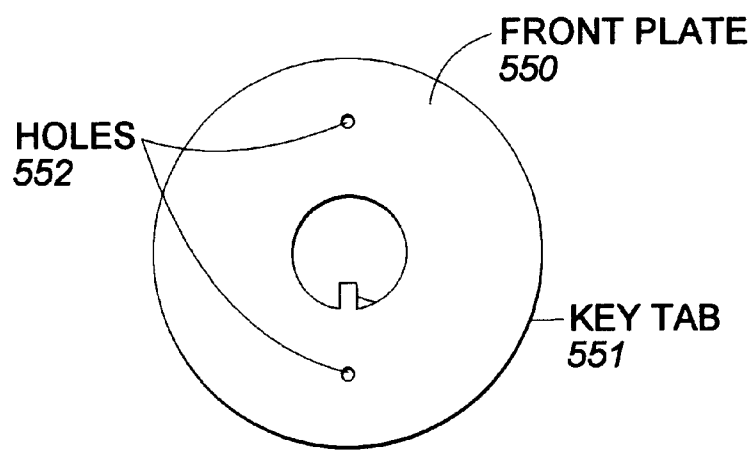
FIG. 33 is a front view of a front plate 550, showing a pair of holes and a key tab.

Referring now also to FIGS. 32 and 33, the rear flanged plate assembly 560 also includes a rear plate 561, a rear flange 564 rigidly attached thereto, and is keyed as known in the art to engage the shaft.

The front plate 550 is configured to include a key tab 551 to engage a keyway in the drive shaft 531, and includes a pair of through holes 552 to allow passage of the through pins 510, 511. A pipe ring 570 is also used as described below.

The outer surface of both portions 502, 503 is provided with gripping teeth or another suitable gripping surface such as known in the art.

As shown in FIG. 32, the rear flanged plate assembly 560 fits onto a shaft 531 of a motor 530.

The two urethane portions 502, 503, are configured to fit together in their configuration shown in FIG. 32, such that the front plate and the rear plate 561 of the rear plate assembly 560 tend to capture the urethane portions 502, 503, along the length of the shaft 531 of the motor 530. The urethane portions 502, 503, are drawn together by the use of a spring 512, which has each of its ends engaging one of the headed portions of the embedded steel pins and captures the pipe ring 570 as shown.

A keyway is provided to allow keyed engagement between the shaft 531 of the gear motor 530 and the front plate 550, the main urethane wheel member 502, and the rear flange plate assembly 560.

Figure 34:
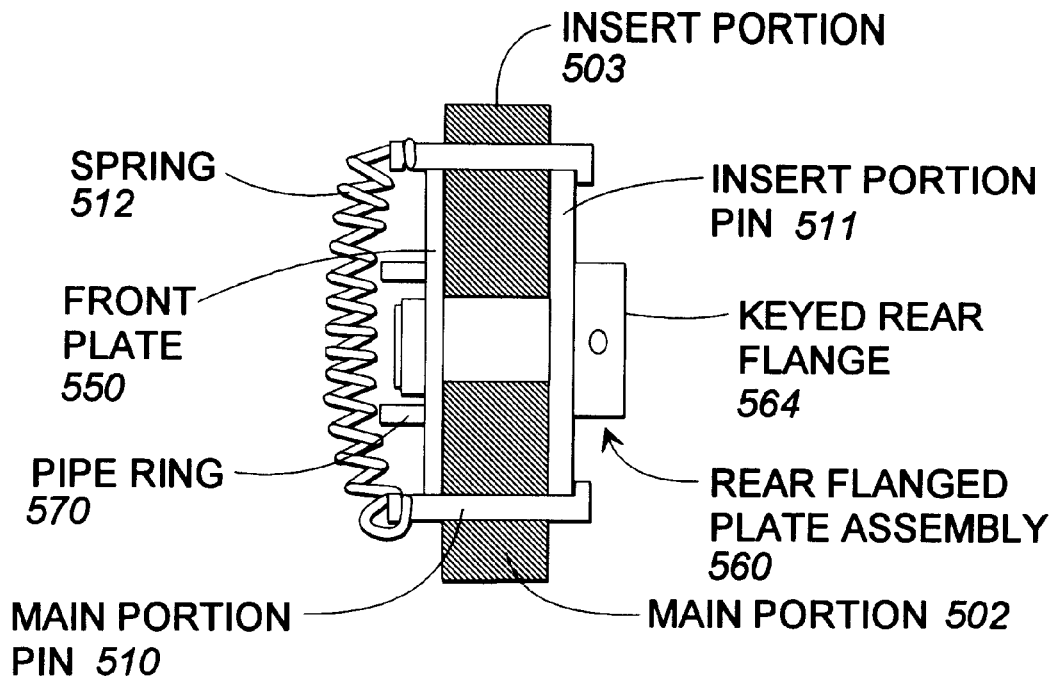
FIG. 34 is a side elevational view of the second multi-segmented disc configuration according to the present invention, showing the main wheel portion 502 and the smaller insert portion 503 in place with a spring and pipe washer likewise in place.
Figure 35:
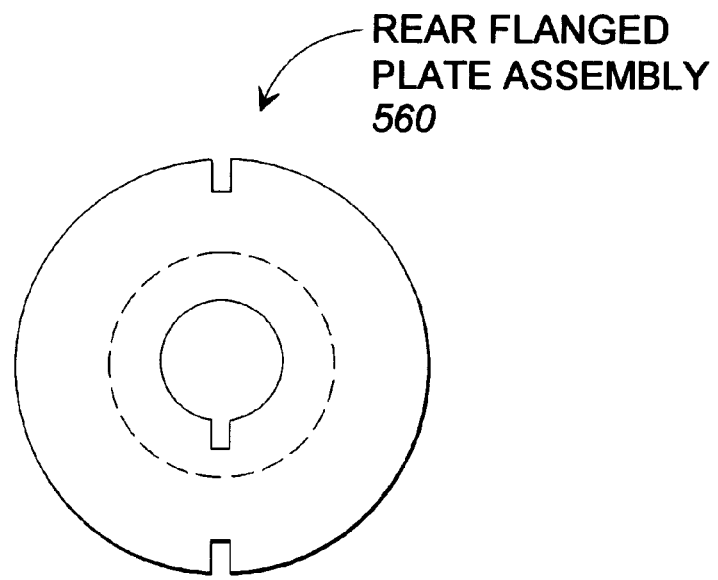
FIG. 35 is a rear isolated plan view of a rear flanged plate assembly 560 according to the present invention, which includes a rear plate 561, and a rear flange 564.

To replace one or both of the urethane portions 502, 503, the spring 512 is first removed, followed by removal of the front plate 550. The urethane portions 502, 503, can then be separated by sliding the smaller member 503, out of the main slot of the larger member 502. Replacement of either or both of the urethane members can then be effected. After the urethane members are in place, the front plate 550 is then replaced, followed by the spring 512. If desired, a pipe ring 570, as shown in FIG. 32, can be used to fit underneath the spring 512 as shown in FIG. 34.

Operation of the disc 500, being round, is similar to the disc 400, although a flat spot may be alternately provided to be used with the pivoting configuration described in reference to FIGS. 18 and 19.

FIGS. 36 and 37 illustrate top plan and side elevational views, respectively of third multi-segmented ejection disc 600 according to the present invention, including a main disc portion 602 and an insert portion 603 slidably insertable into the main portion in a manner similar to that described previously, with respect to, for example, FIG. 30. However, in this configuration, a tension spring 612 is used which engages at its ends to two respective pins each of which are installed in the main disc portion on opposing sides of the main portion's insert-receiving slot. The medial portion of the spring 612 is stretched around a pin member extending through the insert portion 603 and having upwardly (as shown in the drawings) directed hooks which are biased downwardly (as shown in the drawings), such that the spring force tends to cause the plastic insert to remain seated within its position in the main wheel portion.

This configuration may be used with a separate means (not shown) to attach the combination of the two elements 602, 603 to a motor shaft 620, or may be modified to operate in conjunction with other mounting elements such as a flanged rear disc assembly and front disc assembly, motor, etc., to be supported and driven thereby in manners similar to those previously discussed.

In this particular embodiment 600, the multi-segmented disc 600 includes a "flat spot", although as shown elsewhere in this application such a multi-segment disc could not have a flat section.

The thickness of the multi-segmented disc 600 as shown in FIG. 36, as well as the other discs may be within the range of ½ inch to 3 inches, and can be approximately 12 inches in peripheral diameter although other configurations are contemplated without departing from the spirit and scope of the present invention. The peripheral edge of the disc 600 intended to engage packages may be provided with engaging teeth or other suitable frictional engaging means known in the art.

Therefore it may be seen that the invention provides an improved conveying and discharge apparatus which provides numerous improvements over the previously-described prior art, not the least of which includes a simple yet effective discharge device which can be easily replaced with little downtime.

While this invention has been described in specific detail with reference to the disclosed embodiments, it will be understood that many variations and modifications may be effected within the spirit and scope of the invention as described in the appended claims.

What is claimed is:

1. An apparatus for conveying and diverting articles, said apparatus comprising:
    a first conveyor portion;
    a second conveyor portion spaced from said first conveyor portion so as to define an elongate gap therebetween;
    an ejection disc configured for extending through said gap and said conveyor,
    a disc supporting shaft for supporting said disc; and
    shaft rotating means for rotatably driving said supporting shaft,
    said ejection disc being configured to be removed from said disc supporting shaft without disengaging said shaft rotating means from said shaft.

2. The conveying and diverting apparatus as claimed in claim 1, wherein said ejection disc is comprised of at least two segments.

3. The conveying and diverting apparatus as claimed in claim 2, wherein said ejection disc is comprised of two segments.

4. The conveying and diverting apparatus as claimed in claim 3, wherein said segments are semicircular in shape and together form a generally circular disc.

5. The conveying and diverting apparatus as claimed in claim 3, wherein said segments are configured such that one slides within a channel defined by the other.

6. The conveying and diverting apparatus as claimed in claim 4, further comprising a mounting flange attached to said shaft, said mounting flange configured to attach each of said segments to said shaft.

7. The conveying and diverting apparatus as claimed in claim 6, wherein said ejection disc is comprised of two segments.

8. The conveying and diverting apparatus as claimed in claim 7, wherein said segments are semicircular in shape and together form a generally circular disc.

9. The conveying and diverting apparatus as claimed in claim 7, wherein said segments are configured such that one slides within a channel defined by the other.

10. The conveying and diverting apparatus as claimed in claim 9, wherein said segment which slides within the other segment is substantially rectangular in outline.

11. The conveying and diverting apparatus as claimed in claim 10, further comprising a spring for biasing said segments together.

12. The conveying and diverting apparatus as claimed in claim 7, wherein each of said segments includes a projection configured to fit within a slot in said flange, said projection/slot engagement at least assisting in preventing rotation of said segments relative to said shaft.

13. The conveying and diverting apparatus as claimed in claim 12, wherein said flange is a first flange including a slot, and further comprising a second flange, and wherein each of said segments includes projections configured to engage both slots at least assist in preventing rotation of said segments relative to said shaft.

14. The conveying and diverting apparatus as claimed in claim 1, further comprising a second flange removably mounted to said shaft and configured such that said first and second flanges are configured to capture each of said segments therebetween.

15. An ejection disc for use in ejecting parcels from a conveyor path, said ejection disc assembly configured for mounting to a rotatable disc and comprising:
    a first parcel-engaging segment including a projection and also including a first pin fixed therein, said pin including a first and a second end;
    a second parcel-engaging including a projection and also including a second pin, said first and second parcel-engaging segment segments configured to combine to form a substantially circular ejection disc configured for engaging and ejecting parcels;
    a first flange configured to be rigidly attached to said shaft, said first flange including a pair of opposing radially-oriented slots and a pair of apertures; and
    a second flange configured to be rigidly attached to said shaft, said second flange including a pair of opposing radially-oriented slots and a pair of apertures,
    said first and second flanges configured to capture said first and second segments into said ejection disc configuration, such that said projections are captured within said slots to deter radial separation of said segments in a first direction, and such that said pins are captured within said apertures to deter radial separation of said segments in a second direction.

16. The conveying and diverting apparatus as claimed in claim 15, wherein said ejection disc has a substantially circular periphery.

17. The conveying and diverting apparatus as claimed in claim 15, wherein said ejection disc includes a substantially circular periphery except for a flat spot configured to allows said parcel to pass when in a certain position.

18. The conveying and diverting apparatus as claimed in claim 15, further comprising a tension spring for connecting said two pins.

19. A conveying and diverting apparatus for selectively discharging conveying parcels having a lower surface from a conveying path, said conveying and diverting apparatus comprising:
    a conveyor defining an elongate gap transverse to said path, said conveyor including at least one conveyor belt assembly defining one edge of said gap; and
    a substantially planar disc configured for extending upwardly through said gap to contact said lower surface of said panels, said disc being powered to eject a parcel with a force lying substantially parallel to said gap, said ejection disc including a rubber periphery configured to provide a parcel gripping surface, said periphery being toothed to provide said parcel gripping surface.

20. A conveying and diverting apparatus for selectively discharging conveying parcels having a lower surface from a conveying path, said conveying and diverting apparatus comprising:
    a conveyor configured for conveying parcels along said conveying path by supporting said lower surfaces of said parcels, and conveyor defining an elongate gap transverse to said path;
    a substantially planar disc rotatably mounted about an axis substantially parallel to said conveying axis, said disc having a substantially circular periphery;
    a disc supporting shaft substantially rigidly attached to and supporting said disc;
    means for rotatably mounting said disc supporting shaft relative to said conveyor gap along an indexing rotational axis such that said disc supporting shaft pivots about an axis substantially perpendicular to that of said conveying axis such that said when said disc is at a first indexed position, said disc interferes with said parcels in said conveyor path, but when said disc is at a second indexed position, said disc does not interfere with said parcels in said conveyor path; and means for selectively indexing said disc supporting shaft about its longitudinal axis while said disc supporting shaft is rotating, such that parcels on said conveyor may be correspondingly selectively discharged from said conveying path upon the indexing of said disc supporting shaft which causes said disc to contact said lower surfaces of said parcels and to discharge said parcels.

21. A conveying and diverting apparatus for selectively discharging conveying parcels having a lower surface from a conveying path, said conveying and diverting apparatus comprising:

a conveyor configured for conveying parcels along said conveying path by supporting said lower surfaces of said parcels, and conveyor defining an elongate gap transverse to said path;

a substantially planar disc rotatably mounted about an axis substantially parallel to said conveying axis, said disc having a substantially circular periphery;

a disc supporting shaft substantially rigidly attached to and supporting said disc;

a mount for rotatably mounting said disc supporting shaft relative to said conveyor gap along an indexing rotational axis such that said disc supporting shaft pivots about an axis substantially perpendicular to that of said conveying axis such that said when said disc is at a first indexed position, said disc interferes with said parcels in said conveyor path, but when said disc is at a second indexed position, said disc does not interfere with said parcels in said conveyor path; and an indexing device for selectively indexing said disc supporting shaft about its longitudinal axis while said disc supporting shaft is rotating, such that parcels on said conveyor may be correspondingly selectively discharged from said conveying path upon the indexing of said disc supporting shaft which causes said disc to contact said lower surfaces of said parcels and to discharge said parcels.

* * * * *

UNITED STATES PATENT AND TRADEMARK OFFICE
CERTIFICATE OF CORRECTION

PATENT NO. : 6,182,813 B1  
APPLICATION NO. : 09/069424  
DATED : February 6, 2001  
INVENTOR(S) : Bonnet Page 1 of 1

It is certified that error appears in the above-identified patent and that said Letters Patent is hereby corrected as shown below:

Title page, (63) insert the following:

--Related U.S. Application Data

Continuation-in-part of Application No. 08/841,201, Apr. 29, 1997, now US Patent 6,076,653--.

Column 19, line 37, "claim 4" should read --claim 1--.

Column 20, line 10, after "parcel-engaging" insert --segment--; line 12, after "engaging" cancel "segment".

Signed and Sealed this

Twenty-ninth Day of January, 2008

JON W. DUDAS  
*Director of the United States Patent and Trademark Office*